United States Patent
Meyer et al.

(10) Patent No.: US 10,685,297 B2
(45) Date of Patent: Jun. 16, 2020

(54) AUTOMATIC BOOKING OF TRANSPORTATION BASED ON CONTEXT OF A USER OF A COMPUTING DEVICE

(71) Applicant: Google Inc., Mountain View, CA (US)

(72) Inventors: Cayden Meyer, Pyrmont (AU);
Jennifer King Kilpatrick, Stanford, CA (US); Xudong Yang, Pyrmont (AU); Nicholas Caston, Pyrmont (AU); Harold H. W. Kim, Chippendale (AU)

(73) Assignee: GOOGLE LLC, Mountain View, CA (US)

( * ) Notice: Subject to any disclaimer, the term of this patent is extended or adjusted under 35 U.S.C. 154(b) by 715 days.

(21) Appl. No.: 14/949,197

(22) Filed: Nov. 23, 2015

(65) Prior Publication Data
US 2017/0147951 A1    May 25, 2017

(51) Int. Cl.
*G06Q 10/02*    (2012.01)
*G06Q 50/14*    (2012.01)

(52) U.S. Cl.
CPC ............. *G06Q 10/02* (2013.01); *G06Q 50/14* (2013.01)

(58) Field of Classification Search
CPC ................................ G06Q 10/02; G06Q 50/14
See application file for complete search history.

(56) References Cited

U.S. PATENT DOCUMENTS

| | | | |
|---|---|---|---|
| 6,732,080 B1 | 5/2004 | Blants | |
| 8,645,181 B2 | 2/2014 | Lehmann et al. | |
| 2006/0155591 A1* | 7/2006 | Altaf ..................... | G06Q 10/02 705/5 |

(Continued)

FOREIGN PATENT DOCUMENTS

| | | |
|---|---|---|
| JP | 2005235026 A | 9/2005 |
| JP | 2005316933 A | 11/2005 |

(Continued)

OTHER PUBLICATIONS

Ndumu et al. ("Towards Desktop Personal Travel Agents," Jul. 1998, BT Technology Journal Jul. 1998, vol. 16, Issue 3, pp. 69-78, retrieved from https://link.springer.com/article/10.1023/A:1009625830887 (Year: 1998).*

(Continued)

*Primary Examiner* — Michael P Harrington
*Assistant Examiner* — Bryan J Kirk
(74) *Attorney, Agent, or Firm* — Middleton Reutlinger

(57) ABSTRACT

A system is described that infers that a user will need to complete a trip and selects a transportation service that the user can use to complete the trip. The system predicts a time to request a vehicle associated with the transportation service for completing the trip such that the request has sufficiently high degree of likelihood, of causing the vehicle to arrive at a future location by a final departure time; the final departure time being a latest time at which the user is predicted to need to begin traveling. Responsive to determining that a current time is within a threshold amount of time of the predicted time, the system sends, to a reservation system associated with the transportation service, a reservation request for the vehicle associated with the transportation service for completing the trip.

18 Claims, 7 Drawing Sheets

(56) References Cited

U.S. PATENT DOCUMENTS

| | | | |
|---|---|---|---|
| 2007/0245351 A1* | 10/2007 | Sussman | G06F 9/50 718/104 |
| 2008/0195428 A1 | 8/2008 | O'Sullivan et al. | |
| 2009/0192702 A1* | 7/2009 | Bourne | G01C 21/20 701/532 |
| 2010/0305984 A1* | 12/2010 | Ben-Yitschak | G06Q 10/02 705/6 |
| 2011/0099040 A1 | 4/2011 | Felt et al. | |
| 2011/0307280 A1 | 12/2011 | Mandelbaum | |
| 2013/0132887 A1* | 5/2013 | Amin | G06F 3/048 715/781 |
| 2013/0191363 A1 | 7/2013 | LeBeau et al. | |
| 2013/0218455 A1 | 8/2013 | Clark | |
| 2013/0297360 A1* | 11/2013 | Barber | G06Q 10/025 705/6 |
| 2013/0297551 A1 | 11/2013 | Smith | |
| 2013/0345961 A1 | 12/2013 | Leader et al. | |
| 2014/0052675 A1 | 2/2014 | Woo | |
| 2014/0129302 A1* | 5/2014 | Amin | G06Q 50/30 705/13 |
| 2014/0278071 A1* | 9/2014 | San Filippo | G01C 21/3423 701/465 |
| 2014/0278599 A1* | 9/2014 | Reh | B60R 25/24 705/5 |
| 2014/0365250 A1 | 12/2014 | Ikeda et al. | |
| 2015/0032484 A1* | 1/2015 | Mermelstein | G06Q 10/02 705/5 |
| 2015/0149220 A1* | 5/2015 | Omar | G06Q 10/02 705/5 |
| 2015/0161752 A1* | 6/2015 | Barreto | G06Q 50/30 705/7.15 |
| 2015/0185016 A1* | 7/2015 | Faaborg | G01C 21/26 701/522 |
| 2016/0042445 A1* | 2/2016 | Beason | G06Q 30/0645 705/5 |
| 2016/0055605 A1* | 2/2016 | Kim | G06Q 50/30 701/465 |
| 2016/0210675 A1* | 7/2016 | Smart | G06Q 10/02 |
| 2017/0053022 A1* | 2/2017 | Chan | G06F 17/30241 |

FOREIGN PATENT DOCUMENTS

| | | |
|---|---|---|
| JP | 2005327217 A | 11/2005 |
| JP | 2014174130 A | 9/2014 |
| KR | 1020080035727 | 4/2008 |
| KR | 20140023541 A | 2/2014 |
| RU | 2008112196 A | 10/2009 |

OTHER PUBLICATIONS

Woollaston, "Rise of the smart cab: Taxis of the future will broadcast your favourite shows and arrive Before you even order them," Daily Mail Online, Retrieved from <http://www.dailymail.co.uk/sciencetech/article-2805275/Rise-smart-cab-Taxis-future-broadcast-favourite-shows-arrive-order-them.html> Oct. 27, 2014, 20 pp.

Hailo, "Hailo Future Cities Report—Executive Summary," Hailo, Retrieved from <http://www.digitalnewsroom.co.uk/uploads/2014/10/REPORT.pdf> Oct. 23, 2014, 7 pp.

Bentley, "Hailo taxi app unveils new features and teams up with futurologists," CityA.M. Limited, Retrieved from <http://www.cityam.com/1414074661/hailo-taxi-app-unveils-new-features-and-teams-futurologists> Oct. 23, 2014.

Bradbury, "Siri still has a long way to go," Investment Executive, Retrieved from <http://www.pressreader.com/search?newspapers=6511&query=possible%20to%20book%20a%20taxi%20automatically&stop=2013-12-01&start=2013-12-01> Dec. 1, 2013, 1 pg.

International Search Report and Written Opinion of International Application No. PCT/US2016/048678, dated Dec. 5, 2016, 9 pp.

The Japanese Patent Office; Office Action issued in Application No. 2018-526685 dated Jun. 10, 2019.

The Korean Intellectual Property Office; Office Action issued in Application No. 10-2018-7012892 dated Mar. 31, 2019.

European Patent Office; Extended European Search Report issued in Application No. 16869015.4 dated Mar. 1, 2019.

The Korean Intellectual Property Office; Notice of Allowance issued in Application No. 10-2018-7012892 dated Oct. 30, 2019.

The Japanese Patent Office; Notice of Allowance issued in Application No. 2018-526685 dated Jul. 1, 2019.

European Patent Office; Examination Report issued in Application No. 16869015.4; dated Feb. 3, 2020.

\* cited by examiner

AUTOMATIC BOOKING OF TRANSPORTATION BASED ON CONTEXT OF A USER OF A COMPUTING DEVICE

BACKGROUND

A user of a computing device may interact with an on-demand transportation service (e.g., an on-line taxi service) to arrange immediate transportation for traveling between locations. For example, a computing device may generate a calendar alert when it is time for a user to head to the airport. In response to the alert, the user may interact with an application executing at the computing device to book a car for traveling from a current location to the airport. After a brief wait, the car may arrive at a pick-up location and the application may cause the computing device to output a notification that notifies the user that the car is waiting at the pick-up location.

While on-demand transportation services offer some conveniences (e.g., price, scheduling flexibility, etc.), a user still needs to remember to interact with the on-demand transportation service in a timely manner so as to ensure that a vehicle associated with the service will arrive at, and depart from, a pick-up location on-time. Often times, depending on traffic and other unforeseen circumstances, a vehicle may be delayed before actually arriving at a pick-up location. If a user needed to leave immediately (e.g., at the time he or she booked the transportation service), the additional delay can prevent the user in arriving at a final destination on-time.

SUMMARY

In one example, the disclosure is directed to a method that includes inferring, by a computing system, based on information associated with a user of a computing device, that the user will need to complete a trip by traveling from a future location so as to arrive at a future destination by a future time, selecting, by the computing system, a transportation service that the user can use to complete the trip, and determining, by the computing system, a predicted time to request a vehicle associated with the transportation service for completing the trip. A request of the vehicle sent at the predicted time has a degree of likelihood, of causing the vehicle to arrive at the future location by a final departure time, that satisfies a threshold; and the final departure time is a latest time at which the user is predicted to need to begin traveling from the future location to complete the trip and arrive at the future destination by the future time. The method further includes responsive to determining that a current time is within a threshold amount of time of the predicted time to request the vehicle, sending, by the computing system, to a reservation system associated with the transportation service, a reservation request for the vehicle associated with the transportation service for completing the trip, responsive to receiving, by the computing system, from the reservation system, an acknowledgement indicating the reservation request can be satisfied, sending, by the computing system, to the computing device, information for notifying the user that the vehicle is scheduled to arrive at the future location by the final departure time.

In another example, the disclosure is directed to a computing system that includes at least one processor; and at least one module operable by the at least one processor to infer, based on information associated with a user of a computing device, that the user will need to complete a trip by traveling from a future location so as to arrive at a future destination by a future time; select a transportation service that the user can use to complete the trip; and determine a predicted time to request a vehicle associated with the transportation service for completing the trip. A request of the vehicle sent at the predicted time has a degree of likelihood, of causing the vehicle to arrive at the future location by a final departure time, that satisfies a threshold, and the final departure time is a latest time at which the user is predicted to need to begin traveling from the future location to complete the trip and arrive at the future destination by the future time. The at least one module is further operable by the at least one processor to responsive to determining that a current time is within a threshold amount of time of the predicted time to request the vehicle, send, to a reservation system associated with the transportation service, a reservation request for the vehicle associated with the transportation service for completing the trip, and responsive to receiving, from the reservation system, an acknowledgement indicating the reservation request can be satisfied, send, to the computing device, information for notifying the user that the vehicle is scheduled to arrive at the future location by the final departure time.

In another example, the disclosure is directed to a computer-readable storage medium including instructions that, when executed, cause at least one processor of a computing system to infer, based on information associated with a user of a computing device, that the user will need to complete a trip by traveling from a future location so as to arrive at a future destination by a future time; select a transportation service that the user can use to complete the trip; and determine a predicted time to request a vehicle associated with the transportation service for completing the trip. A request of the vehicle sent at the predicted time has a degree of likelihood, of causing the vehicle to arrive at the future location by a final departure time, that satisfies a threshold, and the final departure time is a latest time at which the user is predicted to need to begin traveling from the future location to complete the trip and arrive at the future destination by the future time. The instructions, when executed, further cause the at least one processor of the computing system to responsive to determining that a current time is within a threshold amount of time of the predicted time to request the vehicle, send, to a reservation system associated with the transportation service, a reservation request for the vehicle associated with the transportation service for completing the trip, and responsive to receiving, from the reservation system, an acknowledgement indicating the reservation request can be satisfied, send, to the computing device, information for notifying the user that the vehicle is scheduled to arrive at the future location by the final departure time.

The details of one or more examples are set forth in the accompanying drawings and the description below. Other features, objects, and advantages of the disclosure will be apparent from the description and drawings, and from the claims.

DETAILED DESCRIPTION

Figure 1:
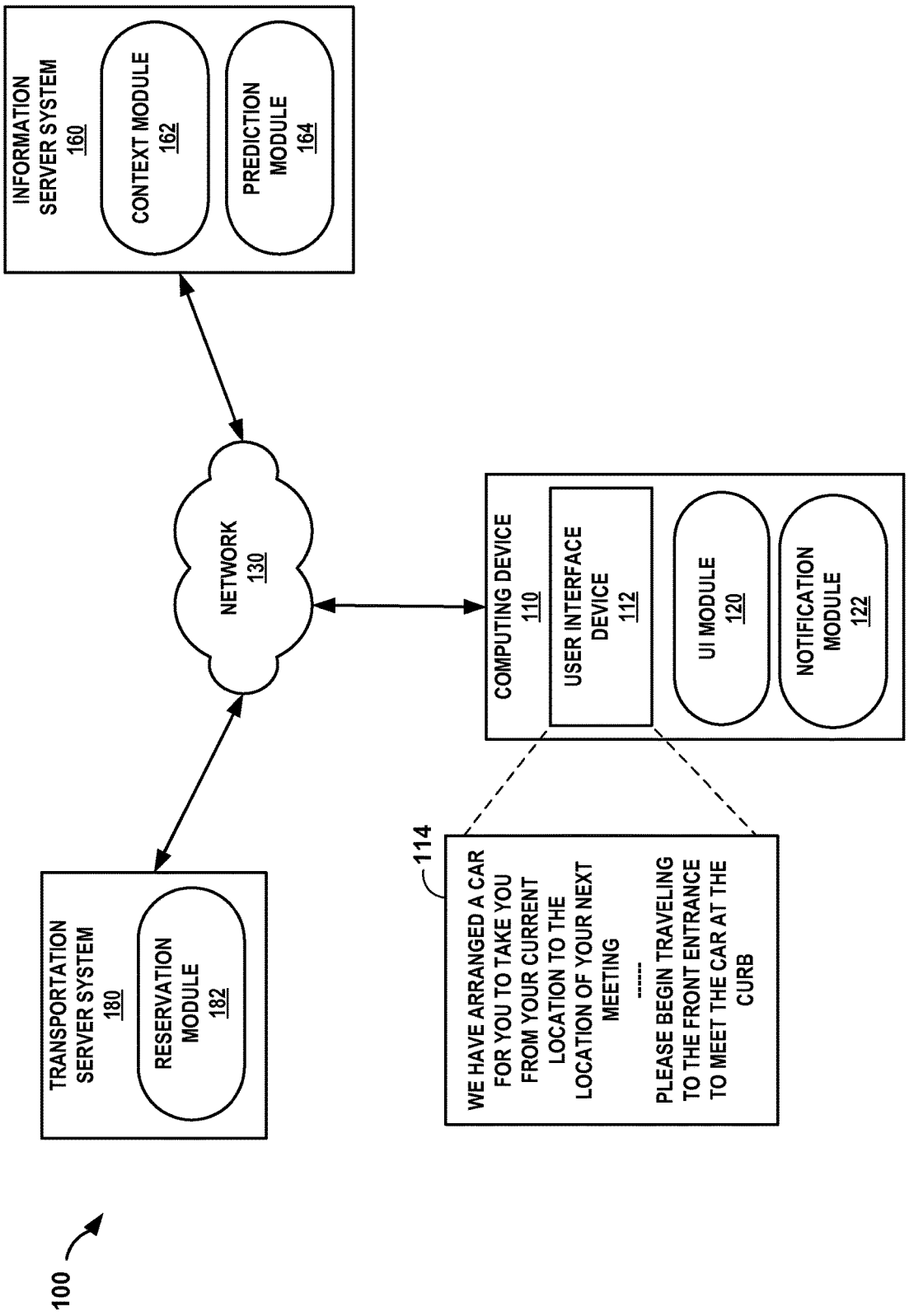
FIG. 1 is a conceptual diagram illustrating an example system for predicting a time for requesting a vehicle associated with a transportation service, in accordance with one or more aspects of the present disclosure.

In general, techniques of this disclosure may enable a computing system to infer (e.g., based on calendar information, communication information, and other information of a user of a computing device) when the user may need "an on-demand, transportation service" (or simply "transportation service" for short) to travel between locations. Examples of on-demand transportation services include any transportations services, whether commercially owned, privately owned, publicly owned, government owned, military owned, or owned and/or organized by any other entity, that respond to individual requests to carry one or more passengers from one geographic location to another geographic location using a vehicle (e.g., automobiles, railway cars, subway cars, trams, trolleys, buses, taxicabs, shuttles, monorails, airplanes, ferries, boats, ships, water taxis, driverless cars, or any other type of transportation vehicle). As used herein, the terms "on-demand transportation service" and "transportation service" refer to those types of transportation services that will, at a particular time that a user chooses, pick-up the user from a current location of the user and take the user to a specific location that the user chooses. In other words, unlike other types of transportation services that typically require a user to pre-arrange or reserve seating, and travel to a dedicated stop, station, or other location that is associated with the transportation service, to meet a vehicle of the transportation service at a pre-scheduled departure time, on-demand transportation services provide vehicles to users a specific locations, often times immediately, or at specific times chosen by the user. For example, the vehicle may be a driverless car (e.g., driven by a computer or machine) that picks the user up at location and time of the user's choosing and takes him or her to a destination.

In some examples, the computing system may predict the best time to engage with the transportation service and request a vehicle associated with the transportation service for traveling between locations so as to increase the chances that the vehicle will arrive at a pickup location, on-time and ready to take the user to a final destination. At the predicted time, the computing system may automatically communicate with a reservation system associated with the transportation service, and book the transportation service on the user's behalf. In some examples, the system may determine, based on movement and/or location information of the computing device, whether the user still intends to travel to the final destination and book or refrain from booking the transportation service accordingly. In some examples, the computing system may adjust the predicted time as information about the user and/or surrounding context changes. In any case, the computing system may send information to the computing device for alerting the user of when and where to meet the vehicle that was arranged on the user's behalf.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating system 100 as an example system for predicting a time to request a vehicle associated with a transportation service, in accordance with one or more aspects of the present disclosure. System 100 includes information server system ("ISS") 160 in communication with transportation server system ("TSS") 180 and computing device 110 via network 130. ISS 160 may predict when a user of computing device 110 is likely to need to request a vehicle of a transportation service, and request the vehicle through TSS 180, at a time that ISS 160 predicts is more likely to produce a vehicle right when and where the user needs it. After requesting the vehicle, ISS 160 may output information to computing device 110 for alerting the user that the vehicle has been scheduled, is on the way, and/or has arrived at the location to take the user to a final destination.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160, TSS 180, and computing device 110. Computing device 110, ISS 180, and ISS 160 may transmit and receive data across network 130 using any suitable communication techniques.

ISS 160, TSS 180, and computing device 110 may each be operatively coupled to network 130 using respective network links. The links coupling computing device 110, TSS 180, and ISS 160 to network 130 may be Ethernet, ATM or other types of network connections, and such connections may be wireless and/or wired connections.

Computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 130.

Computing device 110 includes user interface device (UID) 112 and user interface (UI) module 120. In addition, computing device 110 includes notification module 122. Modules 120-122 may perform operations described using software, hardware, firmware, or a mixture of hardware, software, and firmware residing in and/or executing at respective computing device 110. Computing device 110 may execute modules 120-122 with multiple processors or multiple devices. Computing device 110 may execute modules 120-122 as virtual machines executing on underlying hardware. Modules 120-122 may execute as one or more services of an operating system or computing platform. Modules 120-122 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may each include respective presence-sensitive displays that may receive tactile input from a user of computing device 110. UID 112 may receive indications of tactile input by detecting one or more gestures from a user (e.g., the user touching or pointing to one or more locations of UID 112 with a finger or a stylus pen). UID 112 may present output to a user, for instance at respective presence-sensitive displays. UID 112 may present the output as a graphical user interface (e.g., user interface 114), which may be associated with functionality provided by computing device 110. For example, UID 112 may present various user interfaces (e.g., user interface 114) related to search functions provided by query module 122 or other features of computing platforms, operating systems, applications, and/ or services executing at or accessible from computing device 110 (e.g., electronic message applications, Internet browser applications, mobile or desktop operating systems, etc.).

UI module 120 may manage user interactions with UID 112 and other components of computing device 110. UI module 120 may cause UID 112 to output a user interface, such as user interface 114 (or other example user interfaces) for display, as a user of computing device 110 view output and/or provides input at UID 112. UI module 120 and UID 112 may receive one or more indications of input from a user as the user interacts with the user interface, at different times and when the user and computing device 110 are at different locations. UI module 120 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as ISS 160 and/or TSS 180. In addition, UI module 120 may act as an intermediary between the one or more associated platforms, operating systems, applications, and/or services executing at computing device 110, and various output devices of computing device 110 (e.g., speakers, LED indicators, audio or electrostatic haptic output device, etc.) to produce output (e.g., a graphic, a flash of light, a sound, a haptic response, etc.) with computing device 110.

In the example of FIG. 1, user interface 114 is a graphical user interface associated with a prediction service provided by ISS 160 and accessed by computing device 110. As described in detail below, user interface 114 includes graphical information (e.g., text, images, etc.), which represents information ISS 160 predicts that a user of computing device 110 may need for alerting the user about a vehicle that ISS 160 has requested on behalf of the user. User interface 114 may include various other types of graphical indications such as visual depictions of predicted information that a user of computing device 110 may need for alerting the user about a vehicle that ISS 160 has requested on behalf of the user. UI module 120 may cause UID 112 to output user interface 114 based on data UI module 120 receives via network 130 from ISS 160. UI module 120 may receive graphical information (e.g., text data, images data, etc.) for presenting user interface 114 as input from ISS 160 along with instructions from ISS 160 for presenting the graphical information within user interface 114 at UID 112.

Notification module 122 performs notification management related functions for computing device 110. Notification module 122 may receive information (e.g., notification data) from applications and services executing at computing device 110, as well as notification related data from ISS 160 and, in response, may output an indication of the information to UI module 120 for presentation at UID 112. Notification module 120 may receive notification data from a prediction service provided by ISS 160 and accessed by computing device 110. The prediction service may send notification data to notification module 122 that includes information for alerting a user of computing device 110 about a vehicle, associated with a transportation service which is tied to TSS 180, that ISS 160 has requested on behalf of the user. Notification module 120 may format the vehicle information received from ISS 160, and output an indication (e.g., as text and/or graphical images) of the formatted vehicle information to UI module 120 for presentation at UID 112 (e.g., as user interface 114).

As used throughout the disclosure, the term "notification data" is used to describe various types of information that may indicate the occurrence of an event associated with various platforms, applications, and services executing within an execution environment at one or more computing devices, such as computing device 110. For example, notification data may include, but is not limited to, information specifying an event such as: the receipt of a communication message (e.g., e-mail, instant message, SMS, etc.) by a messaging account associated with a computing device, the receipt of information by a social networking account associated with computing device 110, a reminder of a calendar event (meetings, appointments, etc.) associated with a calendar account of computer device 110, information generated and/or received by a third-party application executing at computing device 110, the transmittal and/or receipt of inter-component communications between two or more components of platforms, applications, and/or services executing at computing device 110, etc. In addition to including information about a specific event, such as the various events described above, notification data may include various attributes or parameters embedded within the notification data that specify various characteristics of the notification data. For example, the notification data may include a portion of data (e.g., a bit, metadata, a field, etc.) that specifies the origin of the notification data (e.g., the platform, application, and/or service that generated the notification data), a priority level, a time to output an alert associated with the notification data, or other characteristics.

ISS 160 and TSS 180 represent any suitable remote computing system, such as one or more desktop computers, laptop computers, mainframes, servers, cloud computing systems, etc. capable of sending and receiving information both to and from a network, such as network 130. ISS 160 hosts (or at least provides access to) a prediction system for predicting when a user of computing device 110 may need a vehicle associated with a transportation service and TSS 180 hosts (or at least provides access to) a reservation system associated with a transportation service from which ISS 160 can reserve a vehicle on behalf of the user.

Computing device 110 may communicate with ISS 160 via network 130 to access the prediction system provided by ISS 160 and in doing so, indirectly access the reservation system provided by TSS 180. In some examples, computing device 110 may communicate with TSS 180 via network 130 to directly access the reservation system provided by TSS 180. In some examples, ISS 160 and/or TSS 180 represent cloud computing systems that provide access to the prediction and reservation systems as services that are accessible via the cloud.

In the example of FIG. 1, TSS 180 includes reservation module 182 which performs operations related to a reservation service that TSS 180 makes accessible to ISS 160, computing device 110, and other computing devices connected to network 130 for requesting and reserving a vehicle associated with a transportation service. Module 182 may perform operations described using software, hardware, firmware, or a mixture of hardware, software, and firmware residing in and/or executing at TSS 180. TSS 180 may execute module 182 with multiple processors, multiple devices, as virtual machines executing on underlying hardware, and/or as one or more services of an operating system or computing platform. In some examples, module 180 may execute as one or more executable programs at an application layer of a computing platform running on ISS 180.

Module 182 may perform operations for scheduling and providing status updates, and handling other information associated with a transportation service. For example, TSS 180 may receive, via network 130, a request for a vehicle associated with an on-demand transportation service. The request may specify a pick-up location and a pick-up time at which the vehicle is to pick-up a user of computing device 110 to take the user to a final destination. In response to the request, TSS 180 may schedule the vehicle by, for example, inputting the request to a job-board or interacting with some other scheduling system associated with the transportation service for notifying a driver associated with the transportation service of the requested pick-up time and location. TSS 180 may respond to the request by sending, via network 130, an acknowledgement indicating that the reservation request can be satisfied in response to determining that a vehicle can be at the pick-up location at the requested time.

In the example of FIG. 1, ISS 160 includes context module 162 and prediction module 164. Together, modules 162 and 164 provide a prediction service accessible to computing device 110 and other computing devices connected to network 130 for predicting when a user of computing device 110 may need a vehicle associated with a transportation service. Modules 162 and 164 may perform operations described using software, hardware, firmware, or a mixture of hardware, software, and firmware residing in and/or executing at ISS 160. ISS 160 may execute modules 162 and 164 with multiple processors, multiple devices, as virtual machines executing on underlying hardware, or as one or more services of an operating system or computing platform. In some examples, modules 162 and 164 may execute as one or more executable programs at an application layer of a computing platform of ISS 160.

Context module 162 of ISS 160 may process and analyze contextual information associated with computing device 110 to define a context of computing device 110. The context of computing device 110 may specify one or more characteristics associated with the user of computing device 110 and his or her physical and/or virtual environment at various locations and times. For example, context module 162 may determine, as part of a context of computing device 110, a physical location associated with computing device 110 at a particular time based on the contextual information associated with computing device 110 from that particular time. As the contextual information changes (e.g., based on sensor information indicative of movement over time), context module 162 may update the physical location in the determined context of computing device 110.

The types of information that define a context of a computing device for a particular location and/or time are too numerous to list. As some examples, a context of a computing device may specify: a location, a movement trajectory, a direction, a speed, a name of an establishment, a street address, a type of place, a building, weather conditions, and traffic conditions, at various locations and times. The context of the computing device may further include calendar information that defines a meeting or an event associated with various locations and times, webpage addresses viewed at various locations and times, text entries made in data fields of the webpages viewed at various locations and times (e.g., search or browsing histories), and other application usage data associated with various locations and times. The context of the computing device may further include information about audio and/or video streams accessed by the computing device at various locations and times, television or cable/satellite broadcasts accessed by the computing device at various locations and times, and information about other services accessed by the computing device at various locations and times.

As used throughout the disclosure, the term "contextual information" is used to describe information that can be used by a computing system and/or computing device, such as ISS 160 and computing device 110, to define one or more physical and/or virtual, environmental characteristics associated with computing devices and/or users of computing devices in addition to one or more observable physical or virtual actions being taken by users of computing devices at a particular time. In other words, contextual information represents any data that can be used by a computing device and/or computing system to determine a "user context" indicative of the circumstances that form the virtual and/or physical experience the user is undergoing for a particular location at a particular time. Examples of contextual information include past, current, and future physical locations, degrees of movement, magnitudes of change associated with movement, weather conditions, traffic conditions, patterns of travel, patterns of movement, application usage, calendar information, purchase histories, Internet browsing histories, and the like. In some examples, contextual information may include sensor information obtained by one or more sensors (e.g., gyroscopes, accelerometers, proximity sensors) of computing devices, such as computing device 110, radio transmission information obtained from one or more communication units and/or radios (e.g., global positioning system (GPS), cellular, Wi-Fi) of computing devices, information obtained by one or more input devices (e.g., cameras, microphones, keyboards, touchpads, mice) of computing devices, and network/device identifier information (e.g., a network name, a device internet protocol address). In some examples, contextual information may include communication information such as information derived from e-mail messages, text messages, voice mail messages or voice conversations, calendar entries, task lists, social media network related information, and any other information about a user or computing device that can support a determination of a user context.

Context module 162 may maintain past and future contextual histories associated with the user of computing device 110. Context module 162 may catalog and record previous contexts of computing device 110 at various locations and times in the past and from the previously recorded contexts, may project or infer future contexts of computing device 110 at various future locations and future times. Context module 162 may associate future days and future times with the recurring contexts of prior days and times, to build a future contextual history associated with the user of computing device 110.

For example, the information contained in a past contextual history of computing device 110 may indicate the location of the user during the user's typical work week as the user travels along a typical route to and from a work location to a home location. Based on the past contextual history, context module 162 may produce a future contextual history that includes information indicating expected locations of the user during a future work week that mirror the actual locations recorded in the past contextual history. In addition, context module 162 may include additional information in the contextual histories, for instance, information about how far a user typically walks to get from different locations, drives between different locations. In other words, the information may be used to infer a preferred walking distance over a preferred driving distance of the user.

Context module 162 may supplement a future contextual history associated with the user of computing device 110 with information stored on an electronic calendar or information mined from other communications information associated with computing device 110. For example, the electronic calendar may include a location associated with an event or appointment occurring at a future time or day when the user is typically at a home location. Rather than include the home location during the future time or day of the event as the expected location in the future contextual history, context module 162 may infer that the user will attend the event and include the event location as the expected location during the future time or day of the event.

Context module 162 may share the past and future contextual histories with prediction module 164 and prediction module 164 may use the past and future location histories to better predict, infer, or confirm when a user of a computing device is likely going to need to request an on-demand transportation service to travel to a future destination. Context module 162 may respond to a request from prediction module 164 of ISS 160 for a current context associated with computing device 110 and/or a future context associated with computing device 110, by outputting data to prediction module 164 that specifies the current or future context of computing device 110.

Based on the past, current, and future contexts determined by context module 162, prediction module 164 of ISS 160 may learn and predict the past, current and future actions that users of computing devices, such as computing device 110, may perform, for each of the different contexts. For example, prediction module 164 may determine, based on a future context of computing device 110, when a user of computing device 110 may need a vehicle associated with a transportation service. Prediction module 164 may determine that when a distance between two locations in a future context is greater than a typical distance that the user walks, and less than the typical distance that the user flies or takes a train, the user may need an on-demand transportation service to travel between the two locations. Prediction module 164 may output information about a prediction to computing device 110 (e.g., for eventual presentation to a user). For example, prediction module 164 may send data to computing device 110 that causes computing device 110 to alert the user when a vehicle associated with the transportation service has been reserved on the user's behalf.

Prediction module 164 is described in greater detail with respect to the additional figures. In summary, prediction module 164 may use machine learning and/or other artificial intelligence techniques to learn and model actions that users of computing device 110 and other computing devices typically take for different contexts. Through learning and modeling actions for different contexts, prediction module 164 may generate one or more rules for predicting actions that the user of computing device 110 takes for different context. For example, prediction module 164 can predict, based on a current context received from context module 162, what a user is doing for a current context and can predict, based on a future context received from context module 162, what the user will be doing for the future context.

As one example, prediction module 164 may infer that when computing device 110 is moving along a particular travel route on a particular day that the user is "driving to work" or "commuting home." As another example, prediction module 164 may determine that when computing device 110 is located in a user's living room on Sunday afternoons in the fall and winter seasons, that the user is watching a particular sports broadcast. As yet another example, prediction module 164 may predict that when computing device 110 is stationary for prolonged periods of time during the late evening or early morning hours of a day that the user is sleeping. As another example, prediction module 164 may predict that when computing device 110 is standing in-line at an airport that the user is moving through a gate security check. And as still another example, prediction module 164 may predict that when computing device 110 is moving down a flight of stairs at a work location at a particular time of day, that the user heading to a next scheduled meeting.

Through learning and modeling future actions that a user may take for future contexts, prediction module 164 may determine useful information that may assist a user of computing device 110 in successfully performing the future action. Prediction module 164 may automatically output notification data or other information to notification module 122 of computing device 110 for alerting a user to information about a prediction. For example, the information that prediction module 164 sends to notification module 122 may cause computing device 110 to output graphical user interface 114 at UID 112.

In accordance with techniques of this disclosure, ISS 160 may infer, based on information associated with a user of computing device 110, that the user will need to complete a trip by traveling from a future location so as to arrive at a future destination by a future time. For example, context module 162 may determine from e-mail messages, an electronic calendar, and/or other information obtained about the user of computing device 110, that a future context of computing device 110 puts the user at a location of a particular restaurant at 6 PM on a given weekday. Context module may further determine, based on a context history of computing device 110, that the user of computing device 110 typically works out of his or her home until 5:30 PM on that particular weekday. Prediction module 164 may receive an indication of the two future contexts determined by context module 162 and determine that the user will likely need to take a trip and travel from his or her home, to arrive at the location of the restaurant by 6 PM.

ISS 160 may select a transportation service that the user can use to complete the trip. For example, prediction module 164 may determine that the location of the restaurant is outside the typical distance that the user travels by foot from his or her home and within the typical distance that the user likes to take on-demand transportation services (e.g., shuttles, taxis, etc.). Accordingly, prediction module 164 may determine that the user will want to take a transportation service to complete the trip to the location of the restaurant.

ISS 160 determine, a predicted time to request a vehicle associated with the transportation service for completing the trip. Specifically, prediction module 164 may determine a final departure time as being a latest time at which the user is predicted to need to begin traveling from the future location (e.g., home) to complete the trip and arrive at the future destination (e.g., the location of the restaurant) by the future time (e.g., 6 PM). Using the final departure time as a guide, prediction module 164 may predict a time to request a vehicle associated with the on-demand transportation service such that a request sent at the predicted time has a degree of likelihood (e.g., defined as a score, a probability, or a percentage), of causing the vehicle to arrive at the future location by the final departure time, that satisfies a threshold (e.g., ninety percent, fifty percent, a score greater than zero, a positive score, etc.). In other words, ISS 160 may predict the best time to engage with TSS 180 to increase the chances that a vehicle associated with the transportations service is ready and waiting for the user at the time and place that the user needs it.

For example, prediction module 164 may determine a time-window for booking the transportation service that will ensure the user has a vehicle waiting when the user wants to or needs to begin traveling. Prediction module 164 may input the home and restaurant location into a rules based model or navigation rule to determine an estimated travel time between the home location and the restaurant location (e.g., twenty minutes). To determine the predicted time, prediction module 164 may subtract the estimated travel time from the future time that prediction module 164 determines the user needs to be at the future location and further subtract the typical wait time experienced when requesting vehicles associated with the transportation service at that particular time. For example, prediction module 164 may determine that the estimated travel time is only twenty minutes, but because vehicles associated with the transportation service typically take five or ten minutes to arrive at a pick-up location near the user's home between 5 PM and 6 PM on a weekday, that the request should be sent to TSS 180 at 5:30 PM rather than 5:40 PM to allow sufficient time for the requested vehicle to arrive at the pick-up location on-time.

In some examples, prediction module 164 may update the predicted time. For example, prediction module 164 may adjust the predicted request time further based on other considerations, such as, time for the user to board the vehicle, to avoid price surging, to avoid busy times when vehicles are less available, to avoid or adjust for changes in traffic, to avoid or adjust for recurring traffic congestion, etc.

As an additional example of prediction module 164 updating the predicted time, context module 162 may provide additional information about the context of the user, updated traffic information, updated weather information, and other information that can alter the output of the rules used by prediction module 164 to determine the best time to request the vehicle. For instance, if an accident occurs along the expected travel route of the vehicle, after prediction module 164 has already determined the predicted time, prediction module 164 may predict, based on updated information from context module 162, that the user will need to leave sooner and therefore adjust the predicted time to allow for more travel time.

Responsive to determining that a current time is within a threshold amount of time of the predicted time to request the vehicle, ISS 160 may send, to reservation module 182, a reservation request for the vehicle associated with the transportation service for completing the trip. For example, prediction module 164 may automatically (i.e., without user intervention) format a communication message for TSS 180 to include an indication of (e.g., data) a request for a vehicle to take the user from his home to the restaurant and send the request to reservation module 182, prior to the predicted time. In some example, prediction module 164 may send the request at the predicted time, and in other examples, prediction module 164 may send the request within a threshold amount of time (e.g., one or more seconds, minutes, hours, days, etc.) before or after the predicted time.

Responsive to receiving an acknowledgement, from reservation module 182, an acknowledgement indicating the reservation request can be satisfied, ISS 160 may send, to computing device 110, information for notifying the user that the vehicle is scheduled to arrive at the future location by the final departure time. For example, prediction module 164 may receive data from TSS 180 indicated that a vehicle is booked and on its way. The data may include an indication of an expected arrival time at the user's home location. Prediction module 164 may send notification information to computing device 110 for causing computing device 110 to alert the user about the scheduled vehicle. For example, the notification information may cause computing device 110 to present user interface 114 when its time for the user to head outside and meet the car. The user interface may include example text that states "we have arranged a car for you to take from your current location to the location of your next meeting—begin traveling to the front entrance to meet the car at the curb."

Accordingly, a user of a computing device that uses an example predictive service as the one provided by the example computing system described herein, no longer needs to remember to book an on-demand transportation service to head to a final destination. In addition, even if the user remembers to book on-demand transportation when he or she is ready to leave, the user need not worry or be impacted by unforeseen circumstances that could delay the vehicle in arriving at a pick-up location or otherwise prevent the user from arriving at the final destination on-time. An example computing system in accordance with the techniques of this disclosure may automatically, without user intervention, determine whether the user will need to book an on-demand transportation service and if so, the computing system will automatically book the service at a predicted time that increases the chances that a vehicle will arrive early enough so that the user will arrive at the final destination on-time. Consequently, the user need not even be aware he or she needs to book transportation; the system will book transportation automatically so that the user may experience less stress and spend less time making travel arrangements.

By automatically arranging user's on-demand travel at just the right time, the example system may enable a computing device to receive fewer inputs from a user searching for information and booking on-demand transportation. With fewer inputs to from a user, the example system may enable computing devices to conserve energy and use less battery power as compared to other systems that merely provide a user with capability to manually book on-demand transportation.

Figure 2:
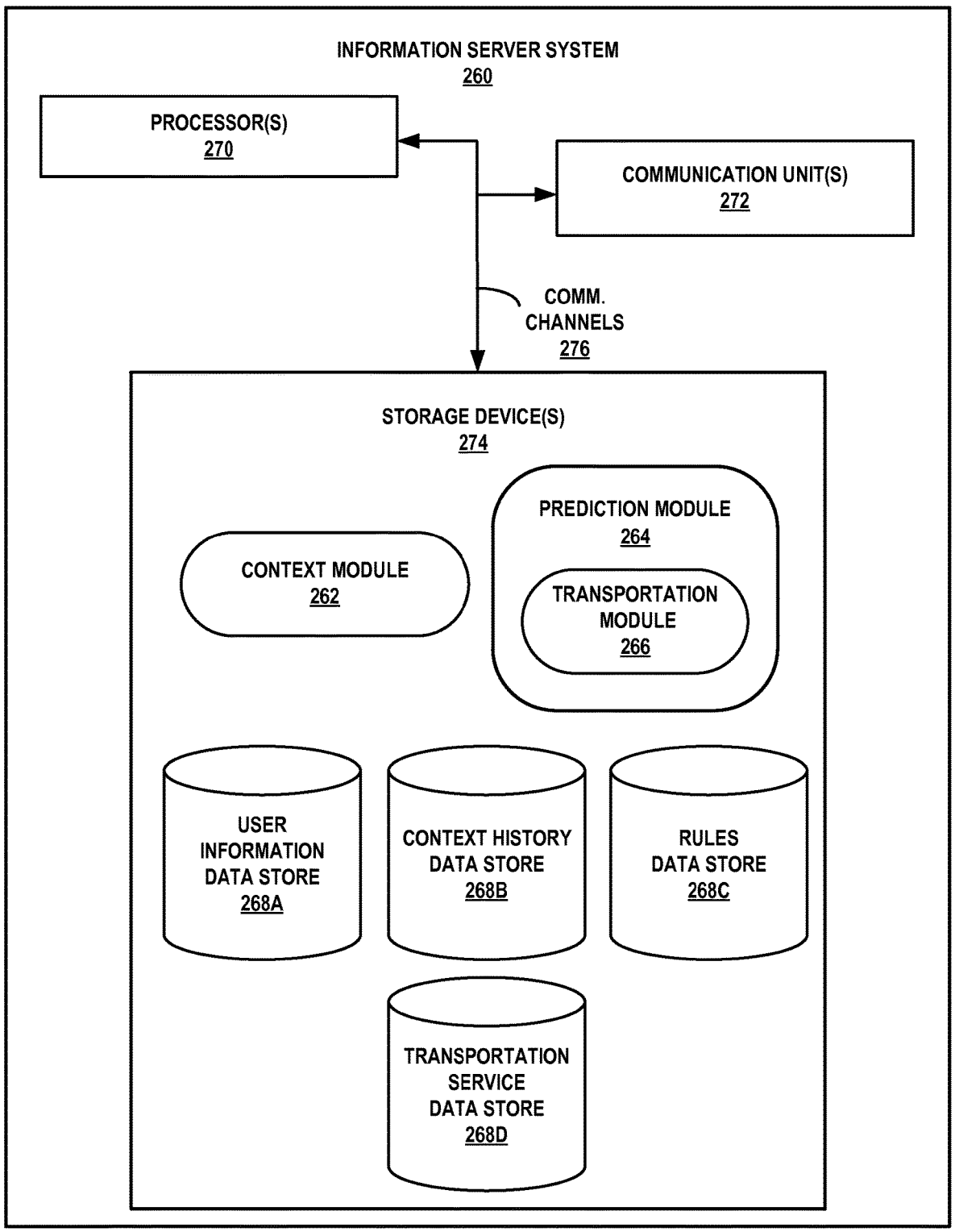
FIG. 2 is a block diagram illustrating an example computing system configured to predict a time for requesting a vehicle associated with a transportation service, in accordance with one or more aspects of the present disclosure.

FIG. 2 is a block diagram illustrating ISS 260 as an example computing system configured to predict a time for requesting a vehicle associated with a transportation service, in accordance with one or more aspects of the present disclosure. ISS 260 is a more detailed example of ISS 160 of FIG. 1 and is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing device 110 with a conduit through which a computing device, such as computing device 110, may access a predictive service for automatically arranging a vehicle of an on-demand transportation service so as to ensure that a vehicle of the transportation service is ready and waiting at a predicted pick-up location, right when the user needs to begin traveling to a final destination. As shown in the example of FIG. 2, ISS 260 includes one or more processors 270, one or more communication units 272, and one or more storage devices 274. Storage devices 274 of ISS 260 include context module 262 and prediction module 264. Within prediction module 264, storage devices 74 includes transportation module 266. Modules 262 and 264 include at least the same, if not more, capability as, respectively, modules 162 and 164 of FIG. 1.

Storage devices 274 of ISS 260 further includes user information data store 268A, context history data store 268B, rules data store 268C, and transportation service data store 268D (collectively, "data stores 268"). Communication channels 276 may interconnect each of the components 270, 272, and 274 for inter-component communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing device 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing device 110 and/or TSS 180. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

Storage devices 274 may store information for processing during operation of ISS 260 (e.g., ISS 260 may store data accessed by modules 262, 264, and 266 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 274 may store program instructions and/or data associated with modules 262, 264, and 266.

One or more processors 270 may implement functionality and/or execute instructions within ISS 260. For example, processors 270 on ISS 260 may receive and execute instructions stored by storage devices 274 that execute the functionality of modules 262, 264, and 266. These instructions executed by processors 270 may cause ISS 260 to store information, within storage devices 274 during program execution. Processors 270 may execute instructions of modules 262, 264, and 266 to predict whether a user of a computing device will be able to take a future action, for various contexts, given the previous actions of other users of other computing devices, for the same contexts, and automatically provide information based on the prediction to other computing devices. That is, modules 262, 264, and 266 may be operable by processors 270 to perform various actions or functions of ISS 270 which are described herein.

The information stored at data stores 268 may be searchable and/or categorized. For example, one or more modules 262, 264, and 266 may provide input requesting information from one or more of data stores 268 and in response to the input, receive information stored at data stores 268. Information server system 260 may provide access to the information stored at data stores 268 as a cloud based, data-access service to devices connected to network 130, such as computing device 110. When data stores 268 contain information associated with individual users or when the information is genericized across multiple users, all personally-identifiable-information such as name, address, telephone number, and/or e-mail address linking the information back to individual people may be removed before being stored at information server system 260. Information server system 260 may further encrypt the information stored at data stores 268 to prevent access to any information stored therein. In addition, information server system 260 may only store information associated with users of computing devices if those users affirmatively consent to such collection of information. Information server system 260 may further provide opportunities for users to withdraw consent and in which case, information server system 260 may cease collecting or otherwise retaining the information associated with that particular user.

Data store 268A represents any suitable storage medium for storing searchable information related to a user of a computing device, such as computing device 110 of FIG. 1. User information data store 268A and transportation service data store 268C may be primarily maintained by prediction module 264 and may be part of, or separate from, contextual history data store 268B which is generally maintained by context module 262.

User information data store 268A may include one or more searchable data bases or data structures that organize the different types of information associated with individual users of computing devices, such as computing device 110 of FIG. 1. In some examples, user information data store 268A includes information related to user search histories, e-mail messages, text based messages, voice messages, social networking information, photos, application data, application usage information, purchase histories, and any and all other information associated with a user and the user's interaction with a computing device such as computing device 110. The user information stored at data store 268A may be searchable. For example, context module 262 may provide a particular date and/or time of day as an input into data store 268A and receive as output pieces of user information related to the input. For example, context module 262 may provide as input a particular day and receive information about a flight indicated in a booking confirmation e-mail of a user of computing device 110. Or, as another example, context module 262 may receive an indication of a keyword query (e.g., a character string) and output an appointment, a purchase that is associated with the keyword.

Data store 268B represents any suitable storage medium for storing searchable contextual histories that include contextual information (e.g., locations, times of day, weather information, traffic information, navigational information, device state information, user information, etc.) organized by date and time. Data store 268B may include past contextual histories and/or future contextual histories. Information server system 260, specifically context module 262, may collect contextual information associated with computing devices, such as computing device 110, and store the collected contextual information at data store 268B. Context module 262 may rely on the information stored at context history data store 268B to determine a context of a user or computing device, such as computing device 110.

Data store 268C may store rules (e.g., of a machine learning system or artificial intelligence system associated with prediction module 264) for predicting actions that may be taken by users of computing devices for various contexts as well as other information to increase a degree of likelihood or improving the odds that the user will be able to complete the predicted actions. Data store 268C may receive as input a context and provide as output a predicted action being taken by a user in the context. For example, inputting a future context of a user for a particular day may cause data store 268C to output an indication that the user will need an on-demand transportation service on that particular day.

Data store 268C may store other rules for determining times, locations, and other information that ISS 260 needs for making predictions for a user, and providing information to the user, so as to increase a degree of likelihood that the user will be able to complete a predicted action. For example, responsive to inputting an indication that the user will need to take on-demand transportation for a particular day into data store 268C, data store 268C may output an indication of a predicted time that has a degree of likelihood, of causing a vehicle associated with the transportation service, to arrive at the future location defined by the future context, by a final departure time defined by the future context, that satisfies a threshold (e.g., is greater than fifty percent, etc.)

Transportation service data store 268D may store information pertaining to on-demand information services that a user of a computing device may take to travel between locations. Information included in data store 268D includes, but is not limited to, time related information (e.g., typical response times for various geographical regions on different calendar days), costs of transportation, different classes or levels of service and associated costs and response times associated with each, and other information. Other information stored at data store 268D may include predicted trip durations between various locations, predicted travel routes between locations, fluctuations in market prices for the on-demand transportation services, and other information related to on-demand transportation services. Prediction module 264 may rely on the information stored at rules data store 268C and the information stored at transportation service data store 268D to provide a predictive, on-demand transportation service to a user of a computing device, such as computing device 110.

Transportation module 266 may access the information stored at transportation service data store 268D in response to requests for transportation service related information from prediction module 264. For example, in evaluating a time to request a vehicle associated with on-demand transportation service, prediction module 264 may query transportation module 266 for estimated trip duration between two geographic locations associated with an on-demand transportation service for completing a trip between the two locations. In response to the request, transportation module 266 may provide prediction module 264 with information (e.g., a distance, a time of travel, etc.) stored at data store 268D that answers the request.

Prediction module 264 may query transportation module 266 for an estimated booking delay associated with an on-demand transportation service, after sending a reservation request to the on-demand transportation service, before a vehicle associated with the on-demand transportation service is predicted to arrive at a future location. In response to the request, transportation module 266 may provide prediction module 264 with an amount of time that typically passes before a vehicle associated with an on-demand transportation service arrives at a future location after a request for the vehicle is submitted to a reservation system of the transportation service.

Prediction module 264 may query transportation module 266 for periods of time that are typically associated with surges in prices associated with a transportation service. In response to the request, transportation module 266 may provide prediction module 264 with various times and days to avoid booking the on-demand transportation service, so as to avoid price surges.

In operation, ISS 260 may infer, based on information associated with a user of a computing device that the user will need to complete a trip by traveling from a future location so as to arrive at a future destination by a future time. For example, prediction module 264 may receive an indication of two future contexts associated with a user of computing device 110. A first of the two future contexts may indicate that the user will be ending a work meeting mentioned in an electronic calendar of the user and a second of the two future contexts may indicate that the user will be starting a meeting one hour later at a location on an opposite side of town.

Prediction module 264 may query transportation module 266 for travel information between the two locations. Transportation module 266 may query data store 268D for an estimated trip distance, estimated trip duration, and other information about a trip using an on-demand transportation service between the two locations and send the information to prediction module 264. Prediction module 264 may determine that the final destination location is greater than a minimum distance threshold (e.g., two blocks, half mile, half kilometer, etc.) from the other future location, and less than a maximum distance threshold (e.g., 100 miles, 200 kilometers, etc.) from the other future location. Specifically, the minimum distance threshold may be based at least in part on a first maximum distance that the user typically walks to events (e.g., several blocks, roughly one mile or a few kilometers) and the maximum distance threshold may be based at least in part on a second maximum distance that the user typically drives to events (e.g., several miles or kilometers). The maximum and minimum thresholds may be based on contextual history information that include location histories and additional information about how far a user typically walks and drives between locations. So long that the distance between the two locations falls between the max and minimum distance thresholds, prediction module 164 may determine that the user will want to take an on-demand travel service between the two locations.

ISS 260 may select a transportation service that the user can use to complete the trip. For example, after determining that the user will want to take an on-demand travel service, prediction module 264 may query transportation module 266 for information about the different on-demand transportation services that can take the user between the future locations and get the user to the final destination on time. Transportation service module 266 may query data store 268D for information about transportation services that can complete the trip. In some examples, transportation module 266 may rank various transportation services according to price, level of satisfaction, etc., and other characteristics indicated by the information stored at data store 268D. Transportation service module 266 may output an indication of various available transportation services and their associated rankings to prediction module 264. Prediction module 264 may select one of the transportation services based on the information provided by transportation service module 266. In some examples, prediction module 264 may select the transportation service that is a lowest cost service from one or more available services that the user can use to complete a trip. For example, prediction module 264 may have access to pricing information for two or more different on-demand transportation service and comparing the pricing for the two or more services and automatically select the service that has the lowest price.

ISS 260 may determine a predicted time to request a vehicle associated with the transportation service for completing the trip where a request of the vehicle sent at the predicted time has a degree of likelihood, of causing the vehicle to arrive at the future location by a final departure time, that satisfies a threshold, and the final departure time is a latest time at which the user is predicted to need to begin traveling from the future location to complete the trip and arrive at the future destination by the future time. For example, prediction module 264 may determine from a first of the two future contexts indicated above, that the work meeting mentioned in the electronic calendar of the user ends at a first time, and that the second meeting mentioned in the electronic calendar begins at a second time, and determine that there is approximately one hour between the first time and the second time.

From information obtained from transportation module 266, prediction module 264 may determine that an estimated trip duration associated with an on-demand transportation service between the two meetings at the time the user would need to travel is approximately forty minutes. In addition, from information obtained from transportation module 266, prediction module 264 may determine that the selected transportation service, at the time the user would need to travel, typically takes one half hour to arrive at the first location (e.g., the pick-up location), to take the user to the second location. Therefore, prediction module 264 may determine that a request to the on-demand transportation service need be sent to TSS 180 at least one hour and ten minutes before the user needs to arrive at the second location. Prediction module 264 may determine that the user is even more likely to arrive at the second location in-time to make the meeting by sending the request to the on-demand transportation service even earlier than one hour and ten minutes before the meeting (e.g., up to and including one hour and a half so as to cause the vehicle to arrive at the pick-up location when the first meeting ends.

In some examples, prediction module 264 may determine the predicted time to request the vehicle by determining that the predicted time coincides within a period of time determined to be associated with surges in market price associated with the transportation service, and adjusting the predicted time to avoid the period of time. In other words, prediction module 264, before sending the request to TSS 180, may query transportation module 266 for an indication of whether a predicted time (e.g., one hour and a half before the second meeting) coincides with a surge pricing time period of the on-demand transportation service. A surge pricing time period may be a certain time of day when demand for on-demand transportation services exceeds availability and therefore the price for booking the service during the surge pricing time is much higher than if a similar service were booked at an earlier or later time. Transportation module 266 may maintain a history of prices across available services overtime include models that predict when future time periods will coincide with surge pricing periods (e.g., during a holiday period when many people are traveling home, during rush hour commuting, during an even commuting time, etc.). Responsive to transportation module 266 providing information indicating that the predicted time does coincide with a surge pricing scenario, prediction module 264 may adjust the predicted time to avoid the surge prices. For example, prediction module 264 may request the vehicle earlier or later, while still attempting to satisfy the requirement of getting the user to the second meeting on-time.

In some examples, responsive to determining that the predicted time coincides within a period of time typically associated with surges in market price associated with the transportation service, ISS 160 may select a particular class of the on-demand transportation service to obtain a lowest price for the transportation service. For example, prediction module 264 may determine from user information data store 268A that the user of computing device 110 typically uses an economy level of service associated with an on-demand transportation service. In conferring with transportation module 266 over whether the expected travel time coincides with a surge pricing condition, prediction module 264 may further determine various prices of the on-demand service, according to level of service, for the estimated travel time. Responsive to determining that a higher or lower class of service than the service that the user typically takes is much lower in price (e.g., a factor lower, or by some other predetermined amount lower) or in response to determining that a different level of service is more likely to arrive at the pick-up location on-time, prediction module 164 may specify the different level of service when requesting a vehicle associated with the on-demand travel service through TSS 180.

In any case, responsive to determining that a current time is within a threshold amount of time of the predicted time to request the vehicle, ISS 160 may send, to a reservation system associated with the transportation service, a reservation request for the vehicle associated with the transportation service for completing the trip. For example, prediction module 264 may send information to TSS 180 one hour and a half before the second meeting. The information may include a request for a vehicle associated with the transportation service provided through TSS 180. TSS 180 may receive the request and immediately dispatch a vehicle to the pick-up location.

Responsive to receiving, from the reservation system, an acknowledgement indicating the reservation request can be satisfied, ISS 160 may send, to the computing device, information for notifying the user that the vehicle is scheduled to arrive at the future location by the final departure time. For example, after sending the request to TSS 180, prediction module 264 may receive an acknowledgement message indicating that the vehicle is on its way and an expected arrival time. ISS 160 may send information about the incoming vehicle to computing device 110 that causes notification module 122 and UI module 120 to alert the user of computing device 110 about the impending arrival of the vehicle.

Figure 3:
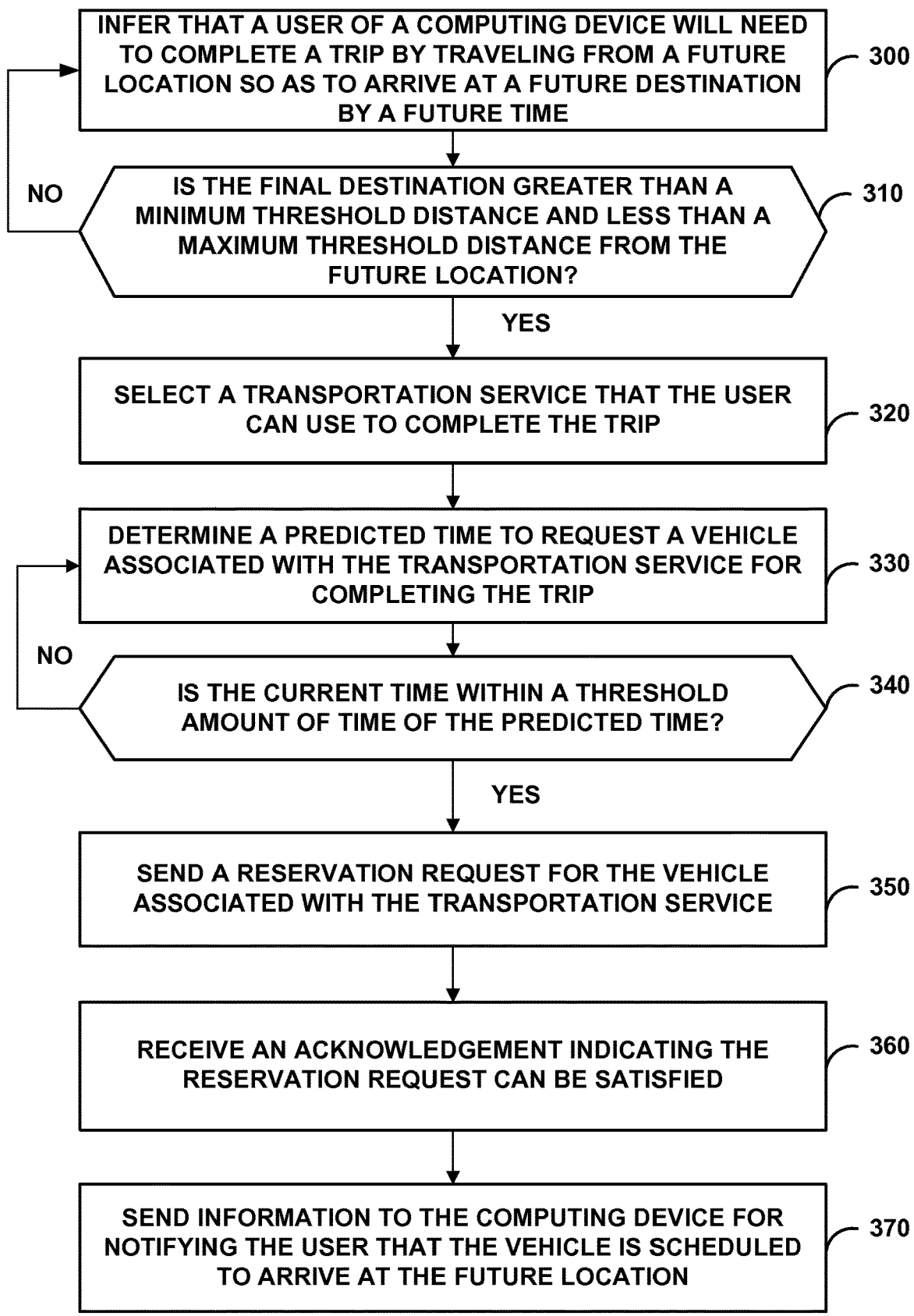
FIGS. 3 and 4 are flowcharts illustrating example operations performed by an example computing system configured to predict a time for requesting a vehicle associated with a transportation service, in accordance with one or more aspects of the present disclosure.
Figure 4:
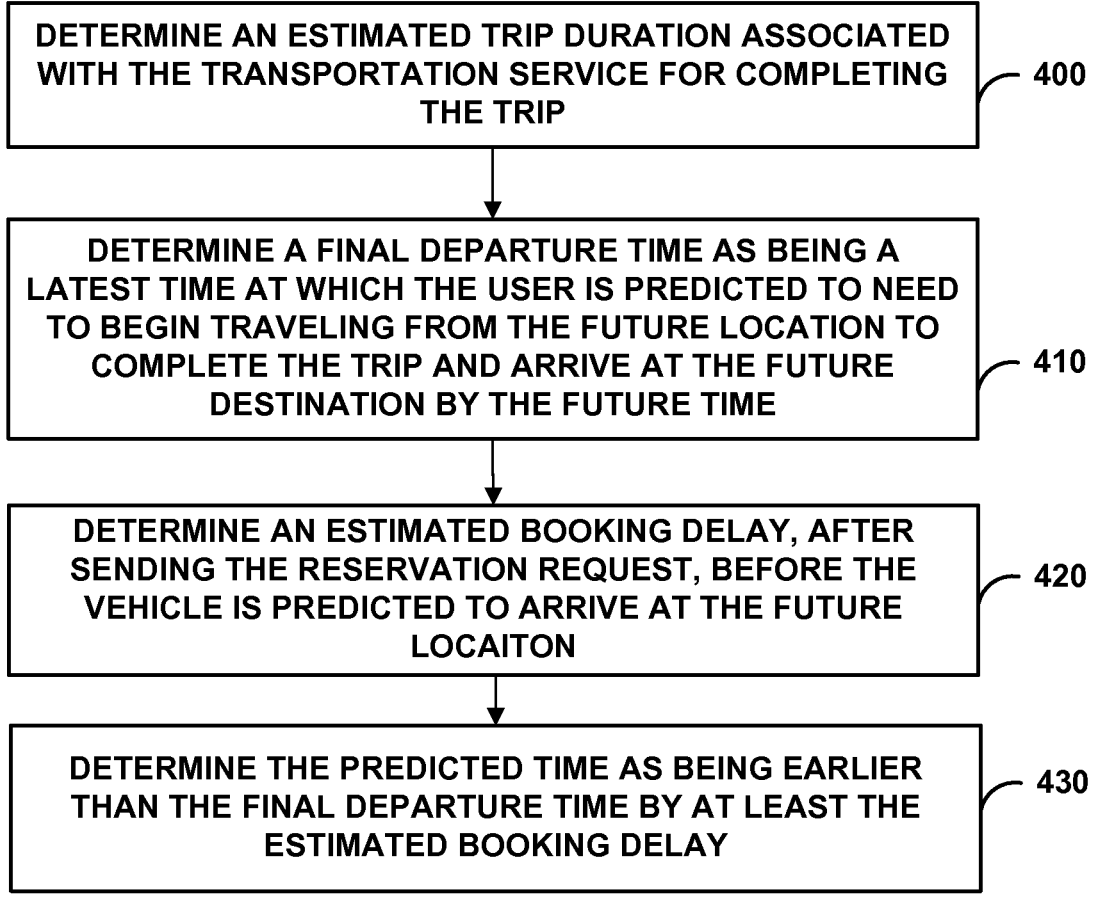

FIGS. 3 and 4 are flowcharts illustrating example operations 300-430 performed by an example computing system configured to predict a time for requesting a vehicle associated with a transportation service, in accordance with one or more aspects of the present disclosure. FIGS. 3 and 4 are described below in the context of system 100 of FIG. 1. For example, ISS 160 may perform operations 300-430, in accordance with one or more aspects of the present disclosure.

As shown in FIG. 3, in operation, ISS 160 may infer that a user of a computing device will need to complete a trip by traveling from a future location so as to arrive at a future destination by a future time (300). For example, prediction module 164 may receive information from context module 162 that an e-mail or electronic calendar associated with a user of computing device 110 indicates the user will need to be at a meeting two hours after landing at an airport.

ISS 160 may determine whether the final destination is greater than a minimum threshold distance and less than a maximum threshold distance from the future location (310). For example, prediction module 164 may determine a typical distance that the user or other users typically travel by foot between destinations and determine that the location of the meeting is greater than the typical distance that the user or other users typically travel by foot away from the airport. In addition, prediction module 164 may determine a typical distance that the user or other users typically avoid on-demand transportation services (e.g., because long distance travel using on-demand transportation services may be cost prohibitive) and determine that the location of the meeting is less than the typical distance that the user or other users typically avoid on-demand transportation services away from the airport.

ISS 160 may select a transportation service that the user can use to complete the trip (320). For example, prediction module 164 may search a navigation database or for information on the Internet related to available, on-demand transportation services that depart from the airport and select one of the available transportation services.

ISS 160 may determine a predicted time to request a vehicle associated with the transportation service for completing the trip (330). For example, prediction module 164 may use a rules based algorithm to determine the best time to request a vehicle associated with the transportation service that increases the likelihood that a vehicle will be at the airport when the user needs it to travel to the meeting. Prediction module 164 may determine that a vehicle associated with the on-demand transportation service is typically only five minutes from the airport and therefore infer that the best time to request the vehicle is five minutes prior to when the user is expected to leave the airport (e.g., after traversing through baggage claim and going through the de-boarding process). Prediction module 164 may determine from one or more rules that other users typically take ten minutes after a plane lands at the airport to exit the airport at a location of an on-demand vehicle and therefore determine that the best time to request the vehicle is five minutes after the plane carrying the user lands.

ISS 160 may determine whether the current time is within a threshold amount of time of the predicted time (340). For example, prediction module 164 may queue up a request for the on-demand transportation service but refrain from sending the request until just prior to, or soon after, the predicted time. Prediction module 164 may periodically update the predicted time (e.g., based on changes to flight status of the plane carrying the user, changes to market pricing, etc.).

Responsive to determining that the current time is within a threshold amount of time of the predicted time, ISS 160 may send a reservation request for the vehicle associated with the transportation service (350). For example, responsive to determining that the predicted time is within (e.g., plus or minus) a threshold amount of time (e.g., one minute, etc.) of the predicted time, prediction module 164 may send a request for a vehicle to TSS 180 which may cause reservation module 182 to dispatch a vehicle for the user to the airport.

ISS 160 may receive an acknowledgement from the reservation system indicating that the reservation can be satisfied (360). For example, after dispatching the vehicle, TSS 180 may reply to the request from prediction module 164 with information about the expected arrival time of the vehicle and pick-up location.

Responsive to receiving the acknowledgement, ISS 160 may send computing device 110 information for notifying the user that the vehicle is scheduled to arrive at the future location (370). For example, prediction module 164 may provide, as part of a prediction service, information that notification module 122 formats and causes UI module 120 to output for display at UID 112, a notification alerting the user of computing device 110 about the inbound vehicle. In response to viewing, feeling, or hearing the notification, the user of computing device 110 may begin walking through the airport to meet the vehicle.

In some examples, prior to sending the reservation request, ISS 160 may send, to the computing device, a request confirming that the user intends to take the trip. In some examples, the indication confirming that the user intends to take the trip comprises an acknowledgement received from the computing device in response to the request. For example, prediction module 164 may cause computing device 110 to warn the user by outputting an alert asking consent from the user to book the vehicle associated with the transportation service. In response to receiving input from the user authorizing the booking of the vehicle, computing device 110 may send information to ISS 160 confirming the authorization to request the vehicle.

FIG. 4 is a more detailed example of operation 320 of FIG. 3. As shown in FIG. 4, ISS 160 may determine the predicted time to request the vehicle associated with the on-demand transportation service by performing operations 400-430.

ISS 160 may determine an estimated trip duration associated with the transportation service for completing the trip (400). For example, prediction module 164 may determine, using a navigation service accessed via the internet, an estimated duration of time that a vehicle of the type provided by the on-demand transportation service typically takes to make the trip from the airport to the meeting location.

ISS 160 may determine, based on the estimated trip duration, the final departure time as being the latest time at which the user is predicted to need to begin traveling from the future location to complete the trip and arrive at the future destination by the future time (410). For example, prediction module 164 may determine that on average, a vehicle associated with the on-demand transportation service takes about one hour to travel from the airport to the location of the meeting and therefore determine the expected "final departure" time as being one hour before the start of the meeting.

ISS 160 may determine, based on the final departure time, an estimated booking delay, after sending the reservation request, before the vehicle is predicted to arrive at the future location (420). For example, prediction module 164 may determine, from one or more rules of a machine learning system, that based on previously observed trips made by other users that the vehicle on-demand transportation service being used typically responds to the airport within five minutes from being requested when a request is sent on hour before the meeting.

ISS 160 may determine the predicted time as being earlier than the final departure time by at least the estimated booking delay (430). For example, in order to ensure that a vehicle is at the airport on time to make the one-hour trip to the meeting, prediction module 164 may request a vehicle associated with the on-demand transportation service at least one hour and five minutes before the meeting.

In some examples, prediction module 164 may determine an updated predicted time based on other information ISS 160 obtains as well as changes to the context of computing device 110. For instance, when the pick-up location of the vehicle is an airport, prediction module 164 may update the predicted time, before sending the request to the reservation system based changes to ground traffic, in response to flight delays, in response to flights departing or arriving earlier than expected, changes to estimated booking delay from the time it takes a vehicle to arrive at the airport, etc. In other words, even if computing device 110 is offline and not providing updated contextual information to context module 162 about computing device 110's whereabouts, prediction module 164 may infer that the vehicle needs to be requested earlier or later depending on circumstance. In other words, ISS 160 and prediction module 164 may update the predicted time in response to detecting a change to at least one of: the future time at which the user needs to be at the final destination, the final departure time that the user is predicted to need to leave to begin traveling to the final destination, and/or the degree of likelihood of causing the vehicle to arrive at the future location by the final departure time (e.g., if prediction module 164 determines that changes in traffic, weather, or other circumstances may cause the vehicle to be less and less likely to arrive on-time to take the user to the final destination).

Figure 5:
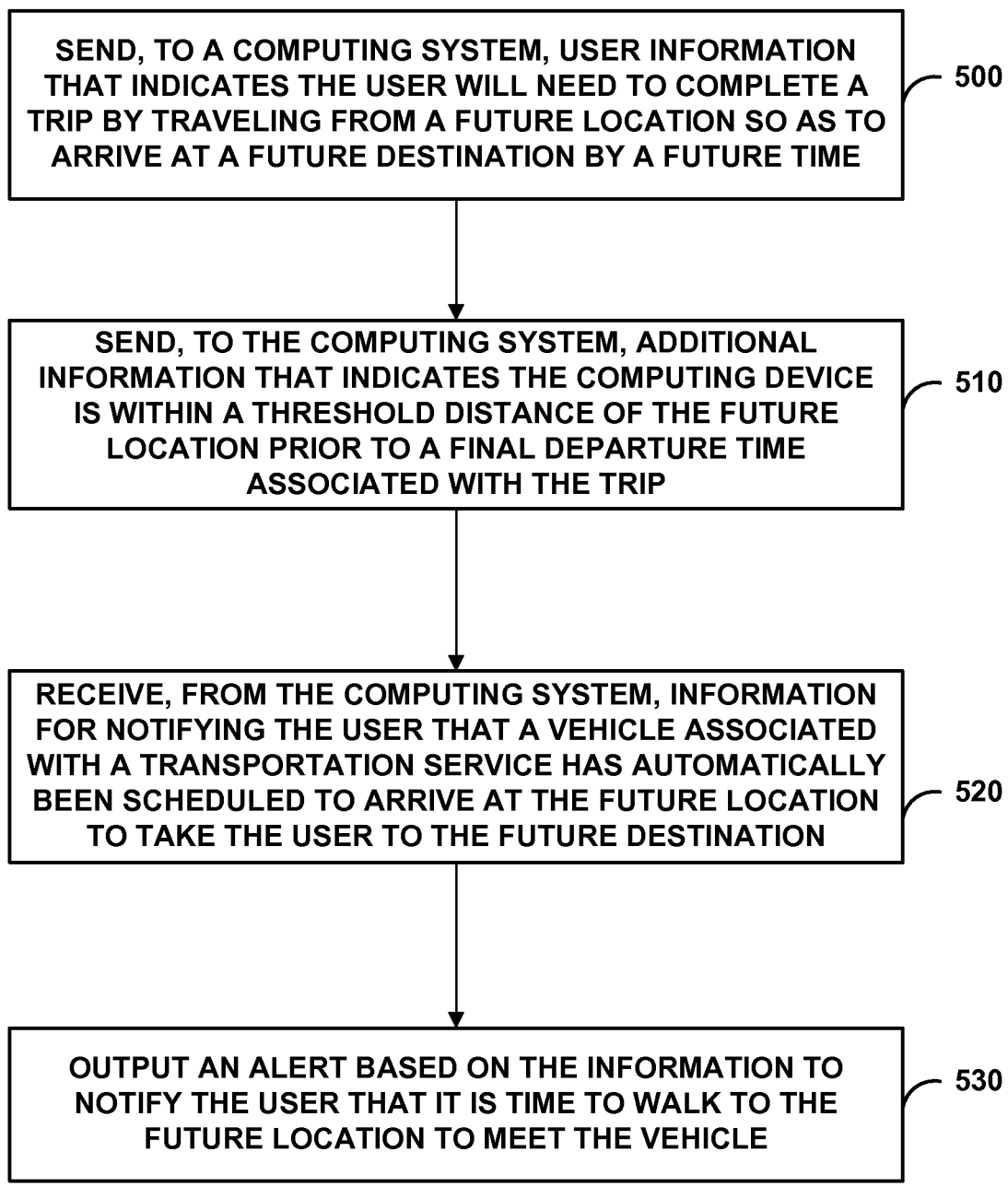
FIG. 5 is a flowchart illustrating example operations performed by an example computing device configured to receive information for notifying a user that a vehicle associated with a transportation service is scheduled to arrive at a future location by a final departure time, in accordance with one or more aspects of the present disclosure.

FIG. 5 is a flowchart illustrating example operations 500-530 performed by an example computing device configured to receive information for notifying a user that a vehicle associated with a transportation service is scheduled to arrive at a future location by a final departure time, in accordance with one or more aspects of the present disclosure. FIG. 5 is described below in the context of system 100 of FIG. 1. For example, computing device 110 may perform operations 500-530, in accordance with one or more aspects of the present disclosure.

In operation, computing device 110 may send, to a computing system, user information that indicates the user will need to complete a trip by traveling from a future location so as to arrive at a future destination by a future time (500). For example, computing device 110 may periodically or occasionally send information to ISS 160 that context module 162 uses to build past and future contextual histories associated with the user of computing device 110. Prediction module 164 may parse the contextual histories associated with the user for information about events that the user may need to schedule on-demand transportation services (e.g., trips from airport, train station, when traveling far from home location and likely without personal transportation, etc.).

Computing device 110 may send, to the computing system, additional information that indicates computing device 110 within a threshold distance of the future location prior to a final departure time associated with the trip (510). For example, movement data associated with computing device 110 may indicate to context module 162 that the context of the user is within walking distance of the predicted future location of the user from which on-demand transportation services is likely needed. If the user is within the threshold distance (e.g., within walking distance) of the future location, prediction module 164 may determine that the user is likely heading to the next event (or a location from which the user could catch an on-demand transportation service to travel to the next event) and therefore will book the vehicle associated with the on-demand transportation service, at the predicted time. Conversely, if the user is outside the threshold distance (e.g., the user is in a different state or several miles or kilometers away from when he or she is predicted to be), prediction module 164 may refrain from requesting the vehicle based on an assumption that the user probably does not want to make the trip after-all.

Computing device 110 may receive, from the computing system, information for notifying the user that a vehicle associated with a transportation service has automatically been scheduled to arrive at the future location to take the user to the future destination (520). For example, at the predicted time, ISS 160 may book, through TSS 180, a vehicle to take the user to the future destination and send computing device 110 information indicating that the vehicle is booked and on its way, in response to receiving an acknowledgement of the request from ISS 180.

Computing device 110 may output an alert based on the information to notify the user that it is time to walk to the future location to meet the vehicle (530). For example, notification module 122 may receive the information from ISS 160, format the information into notification form, and cause UI module 120 to output the formatted information for display at UID 112 (e.g., as shown by user interface 114 of FIG. 1).

In some examples, a computing system that operates in accordance with the techniques of this disclosure may determine that an event in a user's calendar is a flight and automatically schedule a pick-up using an on-demand transportation service at the destination of the flight. In some examples, the computing system may change a pick-up time based on changes to traffic, flight delays or flights leaving early, changes to transportation estimated time of arrival (e.g., booking delay), etc. In some examples, the computing system may provide offline support such that a computing device of a user can be offline and without network access and the example computing system can still arrange transportation for airports and/or other fixed point locations. In some examples, the computing system may automatically filter events to determine when transportation is and is not available or is or is not required. In some examples, the computing system may automatically refrain from booking of an on-demand transportation service if the system determines that the user is already on their way or already nearby the future destination. For instance, the system may receive periodic location updates and infer that if the user is nearly at the future destination (e.g., within walking distance) that the user will not need on-demand transportation. In some examples, the computing system may automatically rebook with a different on-demand transportation service in the event the system learns from the transportation service that a driver of a pre-arranged vehicle has canceled the pick-up or if the transportation system cannot otherwise fulfill the request. In some examples, the computing system may avoids surge pricing if possible by changing level of service or service providers.

In one example, a calendar associated with a user may indicate that the user has scheduled a dinner booked at a final destination at 6 PM. Normally, it takes 20 minutes to travel using an on-demand transportation service to the dinner from the current location of the user, however there is a car crash on the way there. Since the user would normally just try to book a vehicle associated with the transportation service at 5:40 PM, the user may be late because of the crash. In some examples, the computing system may automatically be aware of the crash and alert the user at 5:20 PM that the system has automatically booked a car for the user to get the user to arrive on-time (e.g., by 6 PM).

In another example, the computing system may automatically book an on-demand transportation service for a user of a computing device to take the user to a final destination after an airplane carrying the user arrives at an airport. While a computing device of the user is offline (e.g., the user is in the air without network access), the example computing system learns that the airplane is delayed or scheduled to arrive early, and automatically updates the predicted time for booking the transportation service so that a vehicle of the service arrives just in time to take the user to the final destination.

Figure 6A:
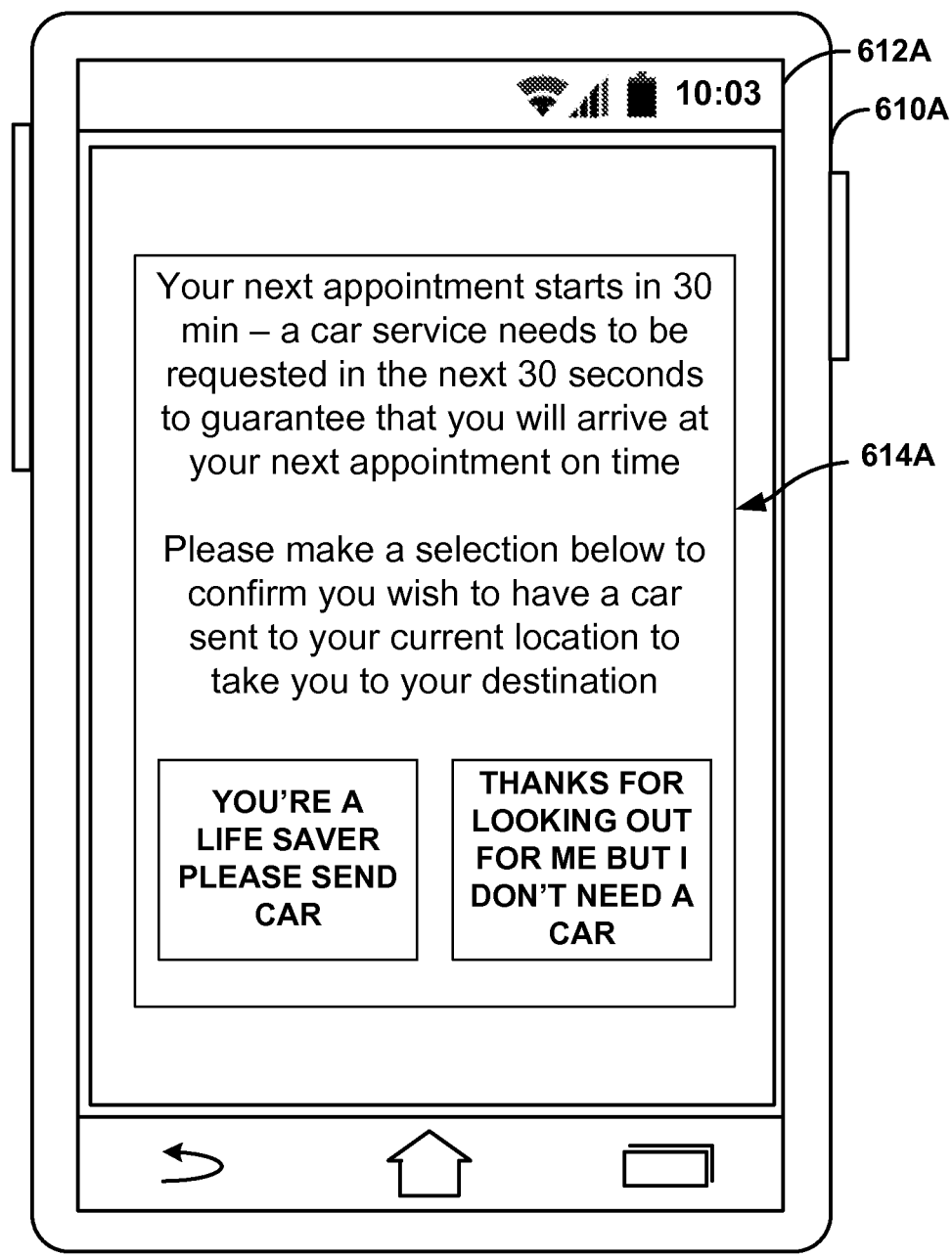
FIGS. 6A and 6B are conceptual diagrams illustrating example graphical user interfaces presented by example computing devices that are configured to receive information for notifying a user that a vehicle associated with a transportation service is scheduled to arrive at a future location by a final departure time, in accordance with one or more aspects of the present disclosure.
Figure 6B:
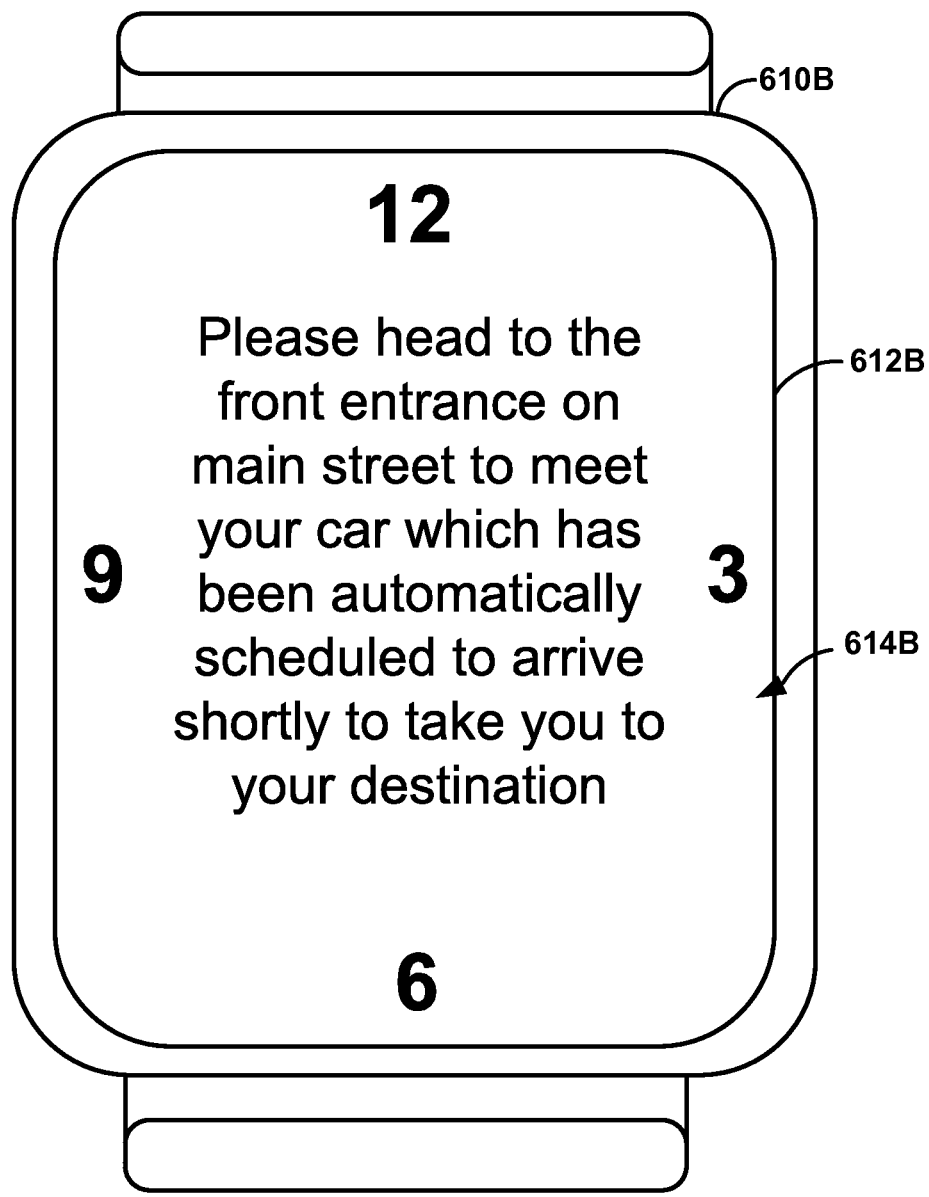

FIGS. 6A and 6B are conceptual diagrams illustrating example graphical user interfaces presented by example computing devices 610A and 610B that are configured to receive information for notifying a user that a vehicle associated with a transportation service is scheduled to arrive at a future location by a final departure time, in accordance with one or more aspects of the present disclosure. FIGS. 6A and 6B described below in the context of system 100 of FIG. 1 and operations 500-530 of FIG. 5. For example, computing devices 610A and 610B are examples of computing device 110 from FIG. 1 and may perform similar operations to those described in FIG. 5.

In the example of FIG. 6A, computing device 610A is a mobile telephone or a tablet device, including a UID 612A for presenting user interface 614A. ISS 160 may automatically send, to TSS 180, a reservation request for a vehicle associated with the transportation service for a user of computing device 610A to complete a trip by traveling from a future location so as to arrive at a future destination by a future time. However, ISS 160 may wait and only send the reservation request in response to receiving, from computing device 610A, an indication confirming that the user intends to take the trip.

In some examples, the indication confirming that the user intends to take the trip comprises location information that indicates computing device 610A is within a threshold distance of the future location. In other examples, the indication confirming that the user intends to take the trip includes an acknowledgement received from the computing device in response to the request. For example, prior to sending the reservation request, ISS 160 may send to computing device 610A, a request confirming that the user intends to take the trip, In response to receiving the request from ISS 160, computing device 610A may output user interface 614A which asks the user of computing device 610A to confirm that he or she would like to have a car sent to take them to their next appointment. In response to detecting a selection of the graphical element in user interface 614A labeled "you're a life saver please send the car" computing device 610A may send an indication to ISS 160 that indeed the user does wish to take the trip, and therefore, ISS 160 may send the request for the car to TSS 180. In response to detecting a selection of the graphical element in user interface 614A labeled "thanks for looking out for me but I don't need a car" computing device 610A may send an indication to ISS 160 that the user does not wish to take the trip, and therefore, ISS 160 may refrain from sending the request for the car to TSS 180.

In the example of FIG. 6B, computing device 610B is a watch device, including a UID 612B for presenting user interface 614B. In other examples, computing device 610A from FIG. 6A may present user interface 614B, after presenting user interface 614A and receiving an acknowledgement that the user intends to take the trip.

Computing device 610B may receive, from ISS 160, information for notifying a user of computing device 610B that a vehicle associated with a transportation service has automatically been scheduled to arrive at a future location of computing device 610B to take the user to a future destination. As shown in FIG. 6B, the information includes a message letting the user that he or she needs to "Please head to the front entrance on main street to meet your car which has been automatically scheduled to arrive shortly to take you to your destination." Computing device 610B may output user interface 614B as an alert based on the information to notify the user that it is time to walk to the future location to meet the vehicle.

Clause 1. A method comprising: inferring, by a computing system, based on information associated with a user of a computing device, that the user will need to complete a trip by traveling from a future location so as to arrive at a future destination by a future time; selecting, by the computing system, a transportation service that the user can use to complete the trip; determining, by the computing system, a predicted time to request a vehicle associated with the transportation service for completing the trip, wherein: a request of the vehicle at the predicted time has a degree of likelihood, of causing the vehicle to arrive at the future location by a final departure time, that satisfies a threshold; and the final departure time is a latest time at which the user is predicted to need to begin traveling from the future location to complete the trip and arrive at the future destination by the future time; responsive to determining that a current time is within a threshold amount of time of the predicted time to request the vehicle, sending, by the computing system, to a reservation system associated with the transportation service, a reservation request for the vehicle associated with the transportation service for completing the trip; and responsive to receiving, by the computing system, from the reservation system, an acknowledgement indicating the reservation request can be satisfied, sending, by the computing system, to the computing device, information for notifying the user that the vehicle is scheduled to arrive at the future location by the final departure time.

Clause 2. The method of clause 1, wherein determining the predicted time to request the vehicle comprises: determining, by the computing system, an estimated trip duration associated with the transportation service for completing the trip; determining, by the computing system, based on the estimated trip duration, the final departure time as being the latest time at which the user is predicted to need to begin traveling from the future location to complete the trip and arrive at the future destination by the future time; determining, by the computing system, based on the final departure time, an estimated booking delay, after sending the reservation request, before the vehicle is predicted to arrive at the future location; and determining, by the computing system, the predicted time as being earlier than the final departure time by at least the estimated booking delay.

Clause 3. The method of any of clauses 1-2, wherein determining the predicted time to request the vehicle comprises: responsive to determining that the predicted time coincides within a period of time determined to be associated with surges in market price associated with the transportation service, adjusting, by the computing system, the predicted time to avoid the period of time.

Clause 4. The method of any of clauses 1-3, wherein the reservation request specifies a particular class of service requested for completing the trip, the method further comprising: responsive to determining that the predicted time coincides within a period of time determined to be associated with surges in market price associated with the transportation service, selecting, by the computing system, the particular class to obtain a lowest price for the transportation service.

Clause 5. The method of any of clauses 1-4, wherein the information associated with the user comprises context information including at least one of: calendar information, communication information, sensor information, and location information.

Clause 6. The method of any of clauses 1-5, wherein the transportation service is selected in response to determining that the transportation service is a lowest cost service from one or more available services that the user can use to complete the trip.

Clause 7. The method of any of clauses 1-6, further comprising: updating, by the computing device, the predicted time in response to detecting a change to at least one of: the future time, the final departure time, or the degree of likelihood of causing the vehicle to arrive at the future location by the final departure time.

Clause 8. The method of any of clauses 1-7, wherein the reservation request is further sent in response to receiving, by the computing system, from the computing device, an indication confirming that the user intends to take the trip.

Clause 9. The method of clause 8, wherein the indication confirming that the user intends to take the trip comprises location information that indicates the computing device is within a threshold distance of the future location.

Clause 10. The method of any of clauses 8-9, further comprising: prior to sending the reservation request, sending, by the computing system, to the computing device, a request confirming that the user intends to take the trip, wherein the indication confirming that the user intends to take the trip comprises an acknowledgement received from the computing device in response to the request.

Clause 11. The method of any of clauses 1-10, wherein the transportation service is selected in response to determining that the final destination location is greater than a minimum distance threshold, and less than a maximum distance threshold, from the future location, wherein: the minimum distance threshold is determined based at least in part on a first maximum distance that the user typically walks to events; and the maximum distance threshold is determined based at least in part on a second maximum distance that the user typically drives to events.

Clause 12. A computer-readable storage medium comprising instructions that, when executed, cause at least one processor of a computing system to: infer, based on information associated with a user of a computing device, that the user will need to complete a trip by traveling from a future location so as to arrive at a future destination by a future time; select a transportation service that the user can use to complete the trip; determine a predicted time to request a vehicle associated with the transportation service for completing the trip, wherein: a request of the vehicle at the predicted time has a degree of likelihood, of causing the vehicle to arrive at the future location by a final departure time, that satisfies a threshold; and the final departure time is a latest time at which the user is predicted to need to begin traveling from the future location to complete the trip and arrive at the future destination by the future time; responsive to determining that a current time is within a threshold amount of time of the predicted time to request the vehicle, send, to a reservation system associated with the transportation service, a reservation request for the vehicle associated with the transportation service for completing the trip; and responsive to receiving, from the reservation system, an acknowledgement indicating the reservation request can be satisfied, send, to the computing device, information for notifying the user that the vehicle is scheduled to arrive at the future location by the final departure time.

Clause 13. The computer-readable storage medium of clause 12, wherein the instructions, when executed, further cause that at least one processor to determine the predicted time to request the vehicle by at least: determining an estimated trip duration associated with the transportation service for completing the trip; determining, based on the estimated trip duration, the final departure time as being the latest time at which the user is predicted to need to begin traveling from the future location to complete the trip and arrive at the future destination by the future time; determining, based on the final departure time, an estimated booking delay, after sending the reservation request, before the vehicle is predicted to arrive at the future location; and determining, by the computing system, the predicted time as being earlier than the final departure time by at least the estimated booking delay.

Clause 14. The computer-readable storage medium of any of clauses 12-13, wherein the instructions, when executed, further cause that at least one processor to determine the predicted time to request the vehicle by at least: responsive to determining that the predicted time coincides within a period of time determined to be associated with surges in market price associated with the transportation service, adjusting the predicted time to avoid the period of time.

Clause 15. The computer-readable storage medium of any of clauses 12-14, wherein the reservation request specifies a particular class of service requested for completing the trip and the instructions, when executed, further cause that at least one processor to: responsive to determining that the predicted time coincides within a period of time determined to be associated with surges in market price associated with the transportation service, select, the particular class to obtain a lowest price for the transportation service.

Clause 16. The computer-readable storage medium of any of clauses 12-15, wherein the information associated with the user comprises context information including at least one of: calendar information, communication information, sensor information, and location information.

Clause 17. The computer-readable storage medium of any of clauses 12-16, wherein the instructions, when executed, further cause that at least one processor to select the transportation service in response to determining that the transportation service is a lowest cost service from one or more available services that the user can use to complete the trip.

Clause 18. The computer-readable storage medium of any of clauses 12-17, wherein the instructions, when executed, further cause that at least one processor to update the predicted time in response to detecting a change to at least one of: the future time, the final departure time, or the degree of likelihood of causing the vehicle to arrive at the future location by the final departure time.

Clause 19. The computer-readable storage medium of any of clauses 12-18, wherein the instructions, when executed, further cause that at least one processor to: send the reservation request in response to receiving, from the computing device, a first indication confirming that the user intends to take the trip; and refrain from sending the reservation request in response to receiving, from the computing device, a second indication confirming that the user does not intend to take the trip.

Clause 20. A computing system comprising: at least one processor; a prediction module operable by the at least one processor to: infer, based on information associated with a user of a computing device, that the user will need to complete a trip by traveling from a future location so as to arrive at a future destination by a future time; select a transportation service that the user can use to complete the trip; determine a predicted time to request a vehicle associated with the transportation service for completing the trip, wherein: a request of the vehicle at the predicted time has a degree of likelihood, of causing the vehicle to arrive at the future location by a final departure time, that satisfies a threshold; and the final departure time is a latest time at which the user is predicted to need to begin traveling from the future location to complete the trip and arrive at the future destination by the future time; responsive to determining that a current time is within a threshold amount of time of the predicted time to request the vehicle, send, to a reservation system associated with the transportation service, a reservation request for the vehicle associated with the transportation service for completing the trip; and responsive to receiving, from the reservation system, an acknowledgement indicating the reservation request can be satisfied, send, to the computing device, information for notifying the user that the vehicle is scheduled to arrive at the future location by the final departure time.

Clause 21. A computing system comprising means for performing any of the methods of clauses 1-11.

Clause 22. The computer-readable storage medium of clause 12, comprising further instructions that, when executed cause the at least one processor of the computing system to perform any of the methods of clauses 1-11.

Clause 23. The computing system of clause 20, comprising means for performing any of the methods of clauses 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
    inferring, by a computing system, based on information associated with a user of a computing device, that the user will need to complete a trip by traveling from a future location so as to arrive at a future destination by a future time;
    selecting, by the computing system, a transportation service that the user can use to complete the trip, wherein selecting the transportation service comprises selecting the transportation service from a plurality of available transportation services, and wherein each of the available transportation services are different on-demand transportation services including a plurality of associated vehicles;
    determining, by the computing system, a predicted time to request a vehicle of the plurality of vehicles associated with the selected transportation service for completing the trip, wherein:
        a request of the vehicle sent at the predicted time has a degree of likelihood that satisfies a likelihood threshold, wherein the degree of likelihood is a likelihood of causing the vehicle to arrive at the future location by a final departure time; and
        the final departure time is a latest time at which the user is predicted to need to begin traveling from the future location to complete the trip and arrive at the future destination by the future time;
    responsive to determining that a current time is within a threshold amount of time of the predicted time to request the vehicle associated with the selected transportation service:
        automatically sending, by the computing system, to the computing device, a request confirming that the user intends to take the trip, wherein the request confirming that the user intends to take the trip causes the computing device to render a user interface prompting the user to confirm that the user intends to take the trip, and wherein the user interface includes an indication of the future destination and the future time, and
        receiving, by the computing system, from the computing device and responsive to sending the request confirming that the user intends to take the trip, an acknowledgement indicating the user intends to take the trip, wherein receiving the acknowledgment indicating that the user intends to take the trip comprises:
            receiving user input, via the user interface of the computing device, the user input confirming that the user intends to take to trip, and
            receiving location information that is generated by the computing device and that indicates the computing device is within a threshold distance of the future location at the current time;
    responsive to receiving, from the computing device, both the user input confirming that the user intends to take the trip and the location information indicating that the computing device is within the threshold distance of the future location at the current time:
        automatically sending, by the computing system, to a reservation system associated with the selected transportation service, a reservation request for the vehicle associated with the selected transportation service for completing the trip, wherein the reservation request causes the reservation system to dispatch the vehicle, associated with the selected transportation service, to the future location; and
    responsive to receiving, from the reservation system, an acknowledgement indicating the reservation request can be satisfied, sending, by the computing system, to the computing device, information for notifying the user that the vehicle associated with the selected transportation service is scheduled to arrive at the future location by the final departure time.

2. The method of claim 1, wherein determining the predicted time to request the vehicle comprises:
    determining, by the computing system, an estimated trip duration associated with the transportation service for completing the trip;
    determining, by the computing system, based on the estimated trip duration, the final departure time as being the latest time at which the user is predicted to need to begin traveling from the future location to complete the trip and arrive at the future destination by the future time;
    determining, by the computing system, based on the final departure time, an estimated booking delay, after sending the reservation request, before the vehicle is predicted to arrive at the future location; and
    determining, by the computing system, the predicted time as being earlier than the final departure time by at least the estimated booking delay.

3. The method of claim 1, wherein determining the predicted time to request the vehicle comprises:

before sending the reservation request, and responsive to determining that the predicted time coincides within a period of time determined to be associated with surges in market price associated with the transportation service, adjusting, by the computing system, the predicted time to avoid the period of time.

4. The method of claim 1, wherein the reservation request specifies a particular class of service requested for completing the trip, the method further comprising:
responsive to determining that the predicted time coincides within a period of time determined to be associated with surges in market price associated with the transportation service, selecting, by the computing system, the particular class to obtain a lowest price for the transportation service.

5. The method of claim 1, wherein the information associated with the user comprises context information including at least one of: calendar information and communication information.

6. The method of claim 1, wherein the transportation service is selected in response to determining that the transportation service is a lowest cost service from one or more available services that the user can use to complete the trip.

7. The method of claim 1, further comprising:
updating, by the computing device, the predicted time in response to detecting a change to the future time.

8. The method of claim 1, wherein the request confirming that the user intends to take the trip causes the computing device to render a user interface prompting the user to confirm that the user intends to take the trip;
wherein receiving the acknowledgement indicating that the user intends to take the trip further comprises receiving user input from the user via the user interface of the computing device in response to the request.

9. The method of claim 1, wherein the transportation service is selected in response to determining that the future destination is greater than a minimum distance threshold, and less than a maximum distance threshold, from the future location, wherein:
the minimum distance threshold and the maximum distance threshold are determined based on location histories of the user,
the minimum distance threshold is determined based at least in part on a first maximum distance that the user has walked to an event; and
the maximum distance threshold is determined based at least in part on a second maximum distance that the user has driven to an event.

10. A non-transitory computer-readable storage medium comprising instructions that, when executed, cause at least one processor of a computing system to:
infer, based on information associated with a user of a computing device, that the user will need to complete a trip by traveling from a future location so as to arrive at a future destination by a future time;
select a transportation service that the user can use to complete the trip, wherein selecting the transportation service comprises selecting the transportation service from a plurality of available transportation services, and wherein each of the available transportation services are different on-demand transportation services including a plurality of associated vehicles;
determine a predicted time to request a vehicle of the plurality of vehicles associated with the selected transportation service for completing the trip, wherein:
a request of the vehicle sent at the predicted time has a degree of likelihood that satisfies a likelihood threshold, wherein the degree of likelihood is a likelihood of causing the vehicle to arrive at the future location by a final departure time; and
the final departure time is a latest time at which the user is predicted to need to begin traveling from the future location to complete the trip and arrive at the future destination by the future time;
responsive to determining that a current time is within a threshold amount of time of the predicted time to request the vehicle associated with the selected transportation service:
automatically send, to the computing device, a request confirming that the user intends to take the trip, wherein the request confirming that the user intends to take the trip causes the computing device to render a user interface prompting the user to confirm that the user intends to take the trip, and wherein the user interface includes an indication of the future destination and the future time, and
receive, from the computing device and responsive to sending the request confirming that the user intends to take the trip, an acknowledgement indicating the user intends to take the trip, wherein the instructions to receive the acknowledgment indicating that the user intends to take the trip further comprise instructions to:
receive user input, via the user interface of the computing device, the user input confirming that the user intends to take to trip, and
receive location information that is generated by the computing device and that indicates the computing device is within a threshold distance of the future location at the current time;
responsive to receiving, from the computing device, both the user input confirming that the user intends to take the trip and the location information indicating that the computing device is within the threshold distance of the future location at the current time:
automatically send, to a reservation system associated with the selected transportation service, a reservation request for the vehicle associated with the selected transportation service for completing the trip, wherein the reservation request causes the reservation system to dispatch the vehicle, associated with the selected transportation service, to the future location; and
responsive to receiving, from the reservation system, an acknowledgement indicating the reservation request can be satisfied, send, to the computing device, information for notifying the user that the vehicle associated with the selected transportation service is scheduled to arrive at the future location by the final departure time.

11. The computer-readable storage medium of claim 10, wherein the instructions, when executed, further cause that at least one processor to determine the predicted time to request the vehicle by at least:
determining an estimated trip duration associated with the transportation service for completing the trip;
determining, based on the estimated trip duration, the final departure time as being the latest time at which the user is predicted to need to begin traveling from the future location to complete the trip and arrive at the future destination by the future time;

determining, based on the final departure time, an estimated booking delay, after sending the reservation request, before the vehicle is predicted to arrive at the future location; and determining, by the computing system, the predicted time as being earlier than the final departure time by at least the estimated booking delay.

12. The computer-readable storage medium of claim 10, wherein the instructions, when executed, further cause that at least one processor to determine the predicted time to request the vehicle by at least:

before sending the request, and responsive to determining that the predicted time coincides within a period of time determined to be associated with surges in market price associated with the transportation service, adjusting the predicted time to avoid the period of time.

13. The computer-readable storage medium of claim 10, wherein the reservation request specifies a particular class of service requested for completing the trip and the instructions, when executed, further cause that at least one processor to:

responsive to determining that the predicted time coincides within a period of time determined to be associated with surges in market price associated with the transportation service, select, the particular class to obtain a lowest price for the transportation service.

14. The computer-readable storage medium of claim 10, wherein the information associated with the user comprises context information including at least one of: calendar information, communication information, and sensor information.

15. The computer-readable storage medium of claim 10, wherein the instructions, when executed, further cause that at least one processor to select the transportation service in response to determining that the transportation service is a lowest cost service from one or more available services that the user can use to complete the trip.

16. The computer-readable storage medium of claim 10, wherein the instructions, when executed, further cause that at least one processor to update the predicted time in response to detecting a change to at least one of: the future time or the degree of likelihood of causing the vehicle to arrive at the future location by the final departure time.

17. The computer-readable storage medium of claim 10, wherein the instructions, when executed, further cause that at least one processor to:

refrain from sending the reservation request in response to receiving, from the computing device, a second indication confirming that the user does not intend to take the trip.

18. A computing system comprising:
at least one processor;
at least one module operable by the at least one processor to:
infer, based on information associated with a user of a computing device, that the user will need to complete a trip by traveling from a future location so as to arrive at a future destination by a future time;
select a transportation service that the user can use to complete the trip, wherein selecting the transportation service causes the at least one module to select the transportation service from a plurality of available transportation services, and wherein each of the available transportation services are different on-demand transportation services including a plurality of associated vehicles;
determine a predicted time to request a vehicle of the plurality of vehicles associated with the selected transportation service for completing the trip, wherein:
a request of the vehicle sent at the predicted time has a degree of likelihood that satisfies a likelihood threshold, wherein the degree of likelihood is a likelihood of causing the vehicle to arrive at the future location by a final departure time; and
the final departure time is a latest time at which the user is predicted to need to begin traveling from the future location to complete the trip and arrive at the future destination by the future time;
responsive to determining that a current time is within a threshold amount of time of the predicted time to request the vehicle associated with the selected transportation service:
automatically send, by the computing system, to the computing device, a request confirming that the user intends to take the trip, wherein the request confirming that the user intends to take the trip causes the computing device to render a user interface prompting the user to confirm that the user intends to take the trip, and wherein the user interface includes an indication of the future destination and the future time, and
receive, by the computing system, from the computing device and responsive to automatically sending the request confirming that the user intends to take the trip, an acknowledgement indicating the user intends to take the trip, wherein receiving the acknowledgment indicating that the user intends to take the trip comprises:
receiving user input, via the user interface of the computing device, the user input confirming that the user intends to take the trip, and
receiving location information that is generated by the computing device and that indicates the computing device is within a threshold distance of the future location at the current time;
responsive to receiving, from the computing device, both the user input confirming that the user intends to take the trip and the location information indicating that the computing device is within the threshold distance of the future location at the current time:
automatically send, to a reservation system associated with the selected transportation service, a reservation request for the vehicle associated with the selected transportation service for completing the trip wherein the reservation request causes the reservation system to dispatch the vehicle, associated with the selected transportation service, to the future location; and
responsive to receiving, from the reservation system, an acknowledgement indicating the reservation request can be satisfied, send, to the computing device, information for notifying the user that the vehicle associated with the selected transportation service is scheduled to arrive at the future location by the final departure time.

\* \* \* \* \*